United States Patent
Wallace

(10) Patent No.: US 10,078,583 B1
(45) Date of Patent: Sep. 18, 2018

(54) METHOD AND SYSTEM FOR REDUCING MEMORY USED IN EMBEDDED DDRS BY USING SPARE DRIVES FOR OOC GC

(71) Applicant: EMC Corporation, Hopkinton, MA (US)

(72) Inventor: Grant Wallace, Pennington, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 106 days.

(21) Appl. No.: 15/086,859

(22) Filed: Mar. 31, 2016

(51) Int. Cl.
*G06F 12/02* (2006.01)
*G06F 3/06* (2006.01)

(52) U.S. Cl.
CPC .......... *G06F 12/0253* (2013.01); *G06F 3/065* (2013.01); *G06F 3/0608* (2013.01); *G06F 3/0629* (2013.01); *G06F 3/0643* (2013.01); *G06F 3/0683* (2013.01); *G06F 2212/1044* (2013.01)

(58) Field of Classification Search
CPC .. G06F 17/30156; G06F 3/0641; G06F 3/067; G06F 11/2094; G06F 12/0253; G06F 17/30153; G06F 17/30159; G06F 17/30162; G06F 2212/401; G06F 2212/7205; G06F 2212/7207; G06F 3/0608; G06F 3/061
See application file for complete search history.

(56) References Cited

U.S. PATENT DOCUMENTS

| | | | |
|---|---|---|---|
| 8,631,052 B1 | 1/2014 | Shilane et al. | |
| 8,639,669 B1 | 1/2014 | Douglis et al. | |
| 8,712,978 B1 | 4/2014 | Shilane et al. | |
| 8,918,390 B1 | 12/2014 | Shilane et al. | |
| 8,972,672 B1 | 3/2015 | Wallace et al. | |
| 9,183,218 B1 | 11/2015 | Wallace et al. | |
| 2014/0075240 A1* | 3/2014 | Maeda | G06F 11/2069 714/6.23 |
| 2016/0179386 A1* | 6/2016 | Zhang | G06F 3/064 711/103 |

\* cited by examiner

*Primary Examiner* — Yong Choe
(74) *Attorney, Agent, or Firm* — Womble Bond Dickinson (US) LLP

(57) ABSTRACT

Embodiments relating to garbage collection for a deduplicated and compressed storage device are described. One embodiment provides for a data storage system comprising an array of redundant storage devices including a first set of storage devices to be configured as live storage devices and a second set of storage devices to be configured as spare storage devices, a spare storage device to be enabled in event of a failure of a live storage device; and a set of processing devices coupled to the array of redundant storage devices, the set of processing devices to execute logic to enable data replication and deduplication for the array of redundant storage devices and perform distributed deduplication garbage collection on the first set of storage devices using one or more devices in the second set of storage devices as temporary storage.

20 Claims, 22 Drawing Sheets

US 10,078,583 B1

METHOD AND SYSTEM FOR REDUCING MEMORY USED IN EMBEDDED DDRS BY USING SPARE DRIVES FOR OOC GC

FIELD OF THE INVENTION

Embodiments of the present invention relate generally to data storage systems. More particularly, embodiments of the invention relate to garbage collection for a deduplicated and compressed storage device.

BACKGROUND

Disaster recovery procedures for data management enable an organization to recover data after catastrophic events such as fire, or floods, hurricanes, and other natural disasters that present risk to locally stored data. To improve reliability of disaster recovery and meet stringent recovery time objectives imposed by businesses and organizations, are increasingly replicating backups to create an offsite copy of critical data. Deduplication and compression of replicated data sets reduces the storage and bandwidth requirements for offsite backup replication.

In deduplicated storage systems, multiple stored files or objects may contain and thus reference the same stored chunk of data. In such scenario, the chunk of data is stored only once and metadata is used to link the files or objects to the stored chunk of data. Stored chunks of data must not be deleted until all references to it have been deleted. However, when a chunk of data is no longer referenced, the chunk of data should be deleted to preserve storage space. This process is typically referred to as garbage collection (GC). Determining when there are no remaining references to a chunk of data is a primary task of the GC process. However, the precise process of determining the set of data that is no longer referenced can be complex and resource intensive, particularly for large data sets.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
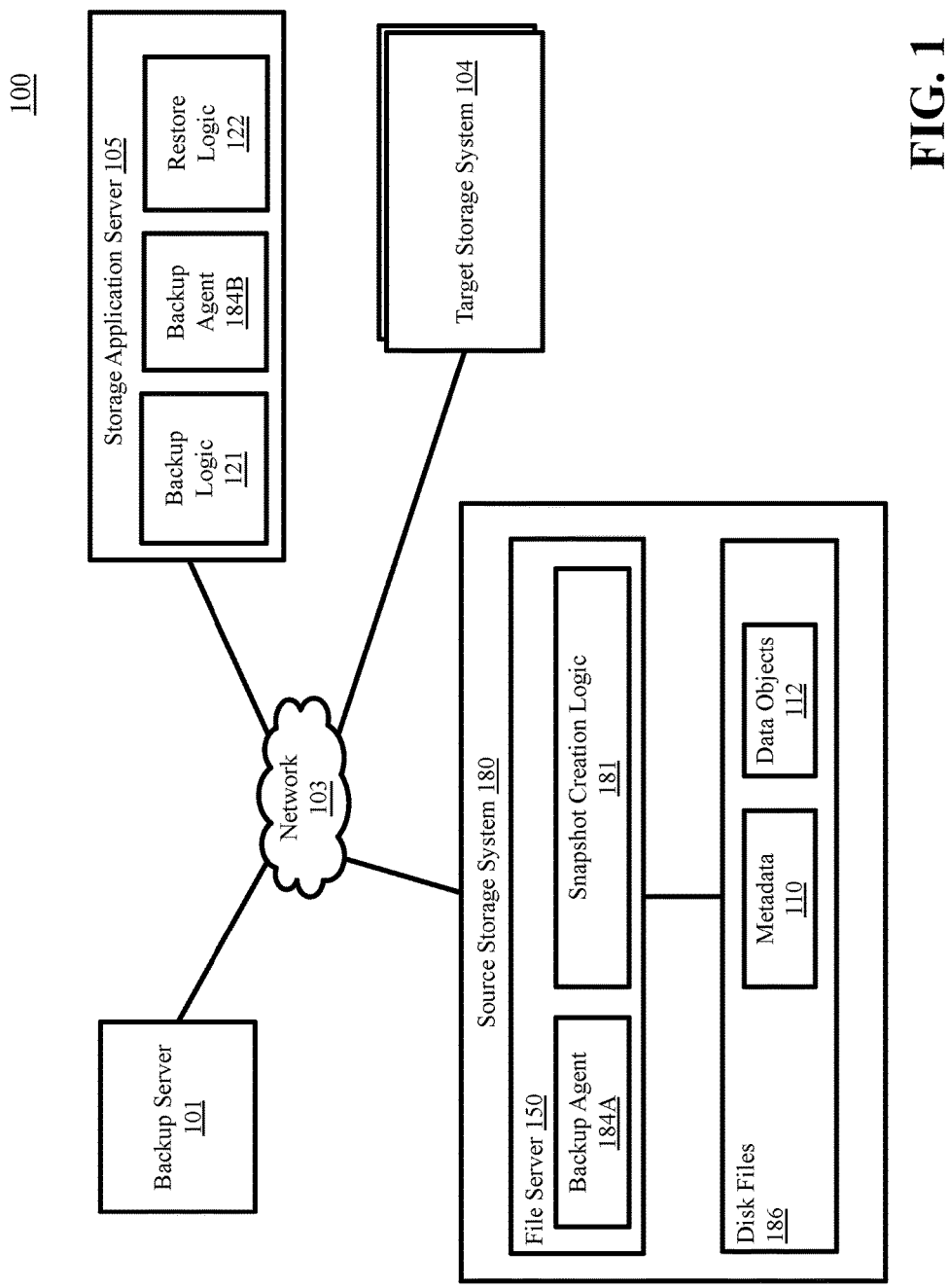
FIG. 1 is a block diagram illustrating a storage system according to an embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

To enable rapid determination of the set of data that is no longer referenced within deduplicated storage, various embodiments of distributed deduplication garbage collection are described herein. Storage systems may be comprised of immutable containers of data. Immutable containers may be used because of storage protocols such as in object stores, or for reasons of data integrity. In an immutable storage container, stored data may not be modified after it is written. Instead, new data is appended to existing data to represent modifications. Dead or unreferenced data segments that exist in an immutable storage container cause storage fragmentation and wasted space. To reclaim this space in such containers a periodic deduplication garbage collection process is performed on deduplicated storage containers in which storage segments associated with live data are copied forward to a new storage container before the exiting storage container is deleted.

In one embodiment, a deduplicated storage system uses a strong (e.g., cryptographic) hash function, such as the SHA-1 hash function, to create hash values that uniquely identify data segments. Such hashes may be referred to as fingerprints (FPs) of the associated data. Each fingerprint has an identifier that is used to map the fingerprint to a Bloom filter. The specific identifier used may be the hash value of the fingerprint value itself or a separate identifier or index associated with the fingerprint.

In one embodiment, a distributed Bloom filter based deduplication garbage collection process is performed in which storage segments in one or more storage containers are processed in parallel to generate a garbage collection recipe for the one or more storage containers. This garbage collection recipe includes a set of live fingerprints for each deduplicated storage container, which are the fingerprints associated with the data segments that make up the current live instance of the data stored within the deduplicated storage. The data segments referenced by these fingerprints can be copied before deleting the storage containers from which the garbage collection recipe was generated.

In various embodiments, distributed Bloom filter deduplication garbage collection process is implemented in a variety of data systems. In one embodiment, deduplication garbage collection for a collection or cluster of deduplicated storage systems can be consolidated in a dedicated and centralized server with a large amount of processing and memory resources relative to deduplicated storage systems. The centralized server can then perform at least a portion of the deduplication garbage collection process for the deduplicated storage containers managed by the collection or cluster of storage system nodes, reducing the aggregate memory and processing requirements for the collection or cluster of nodes.

In one embodiment, distributed deduplication garbage collection is performed using an out-of-core sorting algorithm that has reduced memory requirements relative to the distributed Bloom filter implementation in exchange for a more input/output (I/O) intensive process. This distributed out-of-core deduplication garbage collection includes the enumeration and sorting of the fingerprints of associated data segments stored in one or more storage containers within the storage cluster and storing the fingerprints in a distributed set of temporary files. The sorted fingerprints can then be correlated with a set of sorted fingerprints referenced by live files within the directory/file structure of the deduplicated storage system. A garbage collection recipe for a set of storage containers can then be constructed based on an intersection of a list of all storage container fingerprints and a list of fingerprints referenced by live data.

In various embodiments, a distributed out-of-core based deduplication garbage collection process is implemented in a variety of data systems. In one embodiment, distributed out-of-core deduplication garbage collection can be performed by a virtual appliance in a resource constrained environment using free storage resources that are positioned within a storage array for storage device fault tolerance purposes. In one embodiment, a storage system for a set of virtual machines can be configured with a storage array containing a set of spare storage devices. The spare storage devices may be any active but unused storage device, such as a hot spare storage devices as in a RAID (redundant array of independent disks) array. In general, hot spares may be used in storage arrays configured for RAID 6, 5, 3, 1, or 1/0. However, embodiments are applicable to any redundant storage system in which a spare drive is available for automatic failover and/or reconstruction of the storage array in the event of a storage device failure. The otherwise unused storage resources of the spare drive can be temporarily used for periodic deduplication garbage collection by virtual appliances operating in a resource constrained environment where the storage resources to perform out-of-core garbage collection would otherwise be unavailable. In the event of a drive failure during an out-of-core deduplication garbage collection process, the garbage collection process can be aborted and the spare drives can be immediately repurposed to rebuild the storage array. In some embodiments the garbage collection process is run on the physical server rather than in virtual machines and uses the free storage resources of the physical server.

A data storage system can implement deduplication garbage collection as an integrated part of a deduplicated storage file system, or as a separate service or module that communicates with the deduplicated storage file system. In one embodiment, a separate garbage collection service or module enables the decoupling of the garbage collection recipe generation and the garbage collection copy-forward process, such that a cloud-based storage system can generate a garbage collection recipe for remotely replicated data and the garbage collection recipe can be used for storage space reclamation in the datacenter or storage system separately from where the recipe was created. Remote garbage collection recipe generation can be performed by a remote storage system using Bloom filter or out-of-core based distributed deduplication garbage collection. A garbage collection recipe can be generated for all replicated and deduplicated storage containers in a data set or for a sub-set of storage containers in the data set. In one embodiment, remote or cloud-based storage can be used for extended or long-term retention of backup data on a deduplicated storage system, enabling a separate storage tier for extended retention data, while operational backup and recovery is performed locally. In such environment, a separate garbage collection modules can perform garbage collection of deduplicated storage, such that remote garbage collection can be performed on the remotely stored data while local garbage collection can be performed on the locally stored backup data. In one embodiment where the data is replicated to more than one location, such as in the cloud and in an on-site server, the garbage collection recipe can be generated at one location and sent to the other one or more locations.

In the description of the embodiments provided herein, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Additionally, the terms "server," "client," and "device" are intended to refer generally to data processing systems rather than specifically to a particular form factor for the server, client, and/or device.

Storage System Overview

FIG. 1 is a block diagram illustrating a storage system 100 in accordance with one of the embodiments described herein. The storage system 100 includes a backup server 101 coupled to a source storage system 180, a target storage system 104, and a storage application server 105 over a network 103. In one embodiment, the backup server 101 is responsible for managing the backup of a plurality of storage systems and managing the replication of those backups to other local or remote storage systems. The backup server 101 can direct the back up, replication, and restoration of files, folders, databases, and hard drives, solid state drives, etc., over a network in order to prevent the loss of data in the event of a hard drive failure, user error, disaster, or accident. In one embodiment, backup server 101 manages backups by making requests to storage application server 105. For example, and in one embodiment, the backup server 101 manages backups based on requests to backup data that are received from other clients being operated by users (e.g., a personal computer, workstation, etc.). In this example, the backup server 101 processes the received requests and makes backup requests to storage application server 105. In this way, the backup server 101 acts a system level client that makes requests to backup data on the backend. Alternatively, the backup server 101 may be a primary storage system (e.g., local data center) that provides storage to one or more clients, which may periodically back up the content stored therein to a remote backup replication storage system (e.g., a disaster recovery site or system), such as the target storage system 104. These one or more clients may be any type of client system that includes a server, a host, a personal computer (e.g., desktops, laptops, and tablets), a "thin" client, a personal digital assistant (PDA), a Web enabled appliance, or a mobile phone (e.g., Smartphone), etc. Additionally, the storage system 100 can provide multi-client and/or multi-tenant services.

The network 103 may be any type of network, such as a local area network (LAN), a wide area network (WAN) such as the Internet, a fiber network, a storage network, or a combination thereof. A portion of the network may be wired, wireless, or a combination of wired and wireless. The backup server 101 may be in physical proximity or may be physically remote from client(s), source storage system 180, storage application server 105, or target storage system 104. Moreover, each of the backup server 101, source storage system 180, storage application server 105, and target storage system 104 may be in physical proximity with each other or may be physically remote from each other.

The target storage system 104 may include any type of server or cluster of servers. For example, the target storage system 104 may include a storage server used for at least one of a variety of different purposes—for example, to provide multiple users with access to shared data and/or to back up mission critical data. The target storage system 104 may include, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. The target storage system 104 may have a distributed architecture, or all of its components may be integrated into a single unit. The target storage system 104 may be implemented as part of an archive and/or backup storage system such as a deduplication storage system available from EMC® Corporation of Hopkinton, Mass.

The source storage system 180 may include any type of server or cluster of servers, which may have the same or similar architecture as the architecture of target storage system 104. In one embodiment, source storage system 180 includes a file server 150 and one or more disk file(s) 186. The source storage system 180 may include a storage device having an appliance used to provide NAS capability or a unified storage device (e.g., one which combines NAS and SAN capabilities, a near-line storage device, a DAS device, a tape backup device, or essentially any other type of data storage device. In one embodiment, the file server 150 is an appliance with NAS capability that implements at least one file sharing protocol (e.g., CIFS, SMB, Samba, etc.). The file server 150 can include one or more hard disk drives, solid state drives, or other storage devices, which may be arranged in logical, redundant storage containers (RAID).

In one embodiment, the file server 150 implements a file system (also known as a "filesystem") that controls how data is stored and retrieved. Various file systems may be used. In one embodiment the file server 150 implements the server message block (SMB) protocol, a dialect of the SMB protocol (e.g., CIFS), or an adaptation of the SMB protocol (e.g., Samba), or another protocol that allows applications to remotely read, create, and update files on the file server 150.

In one embodiment, the file server 150 includes a first backup agent 184A, which provides a backup workflow for the one or more file sharing protocols being implemented by the file server 150. In one embodiment, the one or more file sharing protocols include at least one of SMB, CIFS, or Samba. The file server 150, in one embodiment, also includes snapshot creation logic 181 for creating a snapshot of data to be backed up. The snapshot records information of the data at a point in time. It may be a snapshot of the entire file system, or a snapshot of one or more individual files. The snapshot may include information such as data segment references, content handles, etc.

The source storage system 180 also includes one or more disk file(s) 186, which include the data to be backed up to target storage system 104. In one embodiment, the data to be backed up includes metadata 110 and data objects 112. The disk file(s) 186 can be virtual machine (VM) disk file(s) that are the content files of one or more VMs. A virtual machine (VM) represents a completely isolated operating environment with a dedicated set of virtual resources associated with it. A virtual machine may be installed or launched as a guest operating system (OS) hosted by a host OS or a hypervisor. Typically, a host OS or hypervisor represents a virtual machine monitor (VMM) for managing the hosted virtual machines. A virtual machine can be any type of virtual machine, such as, for example, hardware emulation, full virtualization, para-virtualization, and operating system-level virtualization virtual machines. Different virtual machines hosted by a server (e.g., file server 150, storage application server 105) or a storage system (e.g., source storage system 180, target storage system 104) may have the same or different privilege levels for accessing different resources of the server or storage system. The disk file(s) 186 can also include a second backup agent 184B, which coordinates with the first backup agent 184A to provide a backup workflow for the one or more file sharing protocols being implemented by file server 150.

Source storage system 180 may have a distributed architecture, or all of its components may be integrated into a single unit. Source storage system 180 may be implemented as part of an archive and/or backup system, or a disaster recovery system, such as a continuous replication storage system available from EMC® Corporation of Hopkinton, Mass. In one embodiment, the source storage system 180 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment described herein. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system. Again, the architecture of the source storage system 180 and the target storage system 104 may be identical or similar. The description provided in connection with the source storage system 180 may be applied to the target storage system 104, or vice versa.

The storage application server 105 can coordinate with the target storage system 104, source storage system 180, and backup server 101 to run various backup operations. The storage application server 105 handles all application operations between the backup server 101 and the backend of the storage system 100—i.e., source storage system 180 and target storage system 104. The storage application server 105 includes any storage service related components configured or adapted to provide storage services (e.g., storage as a service) to a variety of backup servers 101 using any access protocols as is known in the art. For example, the storage application server 105 may include backup logic 121 and restore logic 122. The backup logic 121 is configured to receive requests to back up data from a backup server 101 and to report to the backup server 101 whether the backup operation from the source storage system to the target storage system 104 was successful or unsuccessful. Restore logic 122 is configured to retrieve and restore backup data from target storage system 104 back to source storage system 180 and to report the successful or unsuccessful restoration of the backed up data to backup server 101. The storage application server 105 can also includes a second backup agent 184B, which works with the first backup agent 184A to provide an improved backup workflow for one or more file sharing protocols (e.g., SMB, CIFS, Samba, etc.) being implemented by file server 150. In one embodiment, the storage application server 105 may be integrated with the backup server 101 as a single server or cluster of servers.

In one embodiment of the storage system 100, backup logic 121 on the storage application server 105 is configured to receive requests from the backup server 101 to backup stored data or to replicate stored backup data. The backup logic 121 can report the successful or unsuccessful storage or replication of the backed up data to the target storage system 104. In one embodiment the backup server 101 directs the continuous backup of data from the source storage system 180 via a journaling mechanism that duplicates write operations to the storage system to a remote copy of the source storage system 180. Writes performed to the source storage system can be automatically replicated to the target storage system 104 over the network 103. The journaling can be performed by the first backup agent 184A, which can store write I/O activity to a journal that is stored in associated with the disk file(s) 186 on the source storage system 180. A remote journal can also exist on the target storage system 104. The remote journal can be used to apply write I/O activity to a remote replica of the disk file(s) 186.

As shown in FIG. 1, the to-be-backed-up data (e.g., data objects 112 and metadata 110) resides at the source storage system 180, which includes file server 150 that is implementing a network file sharing protocol such as, but not limited to, the SMB protocol. The first backup agent 184A receives the request from the second backup agent 184B and directs snapshot creation logic 181 to create a snapshot of to-be-backed-up data. In response to the snapshot being created, file server 150 provides the snapshot to target storage system 104 for storage.

Note that some or all of the components as shown and described may be implemented in software, hardware, or a combination thereof. For example, such components can be implemented as software installed and stored in a persistent storage device, which can be loaded and executed in a memory by one or more processors that, in response to instructions within the software, are configured to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Deduplication Storage System

Figure 2:
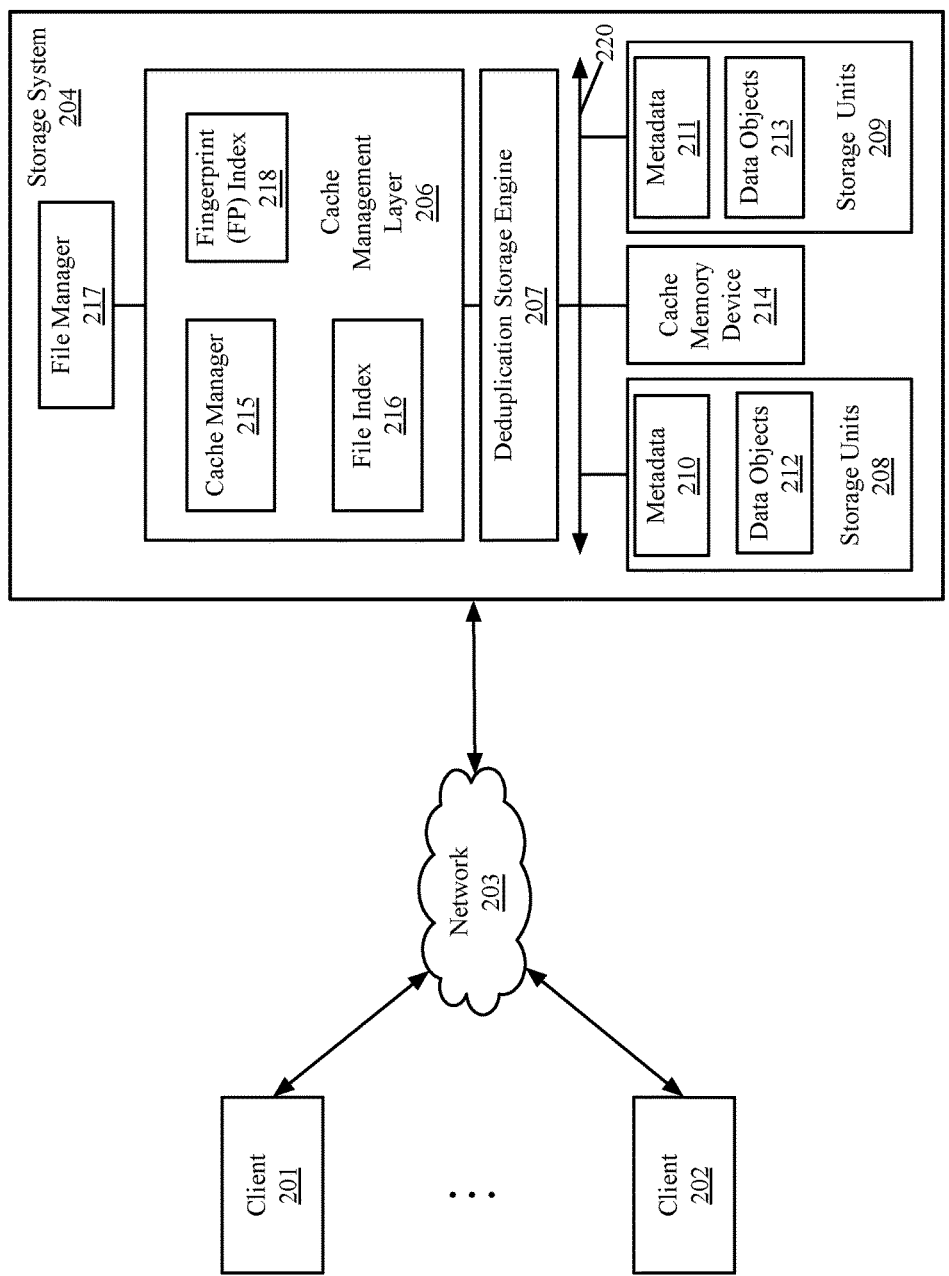
FIG. 2 is a block diagram illustrating an architecture of a storage system including a deduplication storage engine, according to an embodiment.

FIG. 2 is a block diagram illustrating a deduplication storage system 200 according to one embodiment of the invention. The deduplication storage system 200 includes, but is not limited to, one or more client systems, such as client 201 and/or client 202, which are communicatively coupled to the storage system 204 over the network 203. The clients 201, 202 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Alternatively, any of the clients 201, 202 may be a primary storage system that provides storage to other local clients, which may periodically back up the content stored therein to a backup storage system, such as the storage system 204. The network 203 may be any type of networks such as a local area network (LAN), a wide area network (WAN) such as the Internet, a fiber network, a storage network, or a combination thereof, wired or wireless. The clients 201, 202 may be in physical proximity or may be physically remote from one another. The storage system 204 may be located in proximity to one, both, or neither of the clients 201, 202.

The storage system 204 may be used as any type of server or cluster of servers. For example, the storage system 204 may be a storage server used for any of various different purposes, such as to provide multiple users with access to shared data and/or to back up data (e.g., mission critical data). In one embodiment, storage system 204 includes, but is not limited to, a file manager 217, a cache management layer 206, a deduplication storage engine 207, storage units 208, 209, and a cache memory device 214 communicatively coupled to each other. The storage units 208, 209 and the cache memory device 214 may be implemented locally (e.g., single node operating environment) or remotely (e.g., multi-node operating environment) via interconnect 220, which may be a bus and/or a network (e.g., a storage network or a network similar to network 203). The storage units 208, 209 may include a single storage device such as a hard disk, a tape drive, a semiconductor memory, a plurality of storage devices such as a redundant array system (e.g., a redundant array of independent disks (RAID)), a system for storage such as a library system or network attached storage system, or any other appropriate storage device or system. The cache memory device 214 can include one or more of volatile, non-volatile, or a combination of volatile and non-volatile devices.

The file manager 217 may be executed by a processor to provide an interface to access files stored in the storage units 208, 209 and the cache memory device 214. The cache management layer 206 contains a cache manager 215, file index 216, and optionally a fingerprint (FP) index 218. Cache management layer 206 and file manager 217 reside in memory of a processor in one embodiment.

In one embodiment, the file index 216 is used to access data cached in cache memory device 214. The fingerprint index 218 is used to de-duplicate data stored in cache memory device 214 and the storage units 208, 209. In one embodiment the fingerprint index 218 is a partial index that covers a portion of data stored in the cache memory device and/or storage units 208, 209, with the remainder of the fingerprint data stored in the metadata 210, 211 of an associated one of the storage units 208, 209. In one embodiment, the metadata 210, 211 includes a file name, a storage unit where the segments associated with the file name are stored, reconstruction information for the file using the segments, and any other appropriate metadata information related to the files and underlying data objects on each storage unit.

In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of all storage units associated with the storage system in the event that the main metadata is lost, corrupted, damaged, etc. Metadata for a storage unit can be reconstructed using metadata information stored on a main storage unit or other storage unit or units (e.g., replica storage unit). Metadata information further includes index information (e.g., location information for segments in storage units). In one embodiment, metadata includes prime segment information that can be used to provide a consistent point of a file system and/or reconstruct a file system in the event of file system failure.

When data is to be stored in the storage units 208, 209, the deduplication storage engine 207 is configured to segment the file data into multiple chunks (also referred to as segments) according to a variety of segmentation policies or rules. The deduplication storage engine 207 may choose not to store a chunk in a storage unit if the chunk has been previously stored in the storage unit. In the event that the deduplication storage engine 207 does not to store the chunk in the storage unit, the deduplication storage engine 207 can store metadata enabling the reconstruction of the file using the previously stored chunk. As a result, chunks of file data are stored in a deduplicated manner as data objects 212, 213 within one or more of the storage units 208, 209. The metadata 210, 211 may be stored in at least some of storage units 208, 209, such that files and associated data objects 212, 213 in a storage unit can be accessed independently of another storage unit. In general, the metadata of each storage unit includes sufficient information to provide access to the files that are backed by the data objects 212, 213 on the storage unit.

Figure 3:
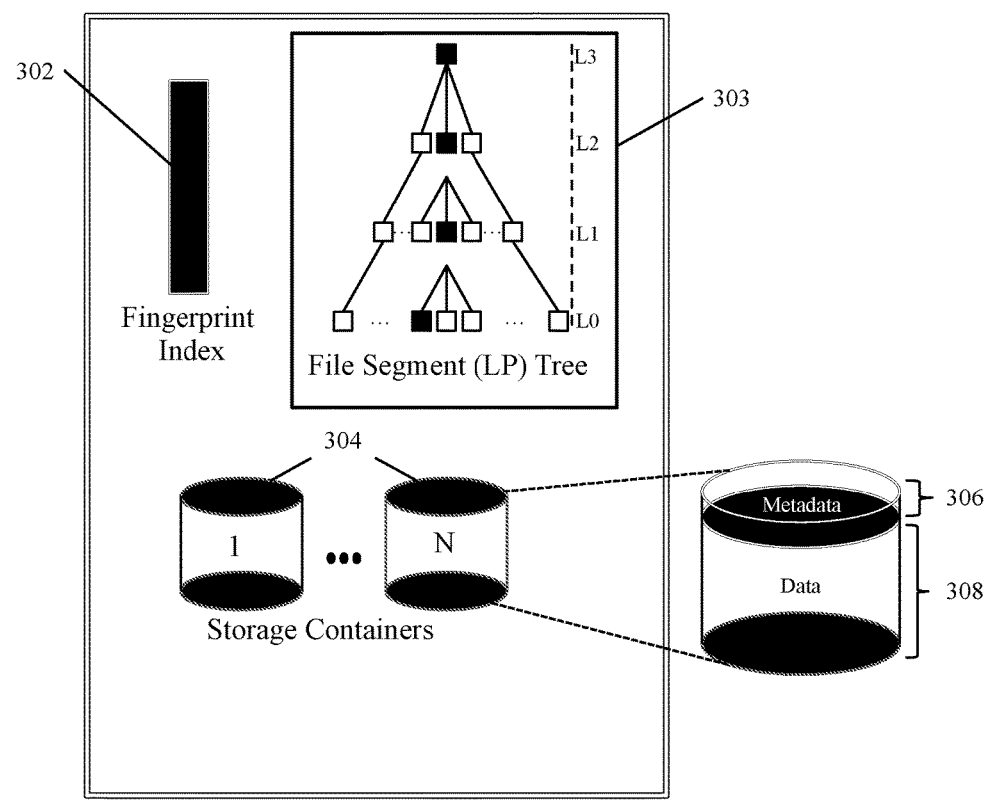
FIG. 3 illustrates a deduplication file system, according to an embodiment.

FIG. 3 illustrates a deduplication file system 300, according to an embodiment. The deduplication file system includes a fingerprint index 302, such as the fingerprint index 218 of FIG. 2, a file segment tree 303, and one or more storage containers 304 including metadata 306 and data 308. One or more of the storage containers 304 can be stored on each of the storage units 208, 209 of FIG. 2. The metadata 306 can contain at least a portion of the metadata 210, 211 of FIG. 2. The data 308 can contain at least a portion of the data objects 212, 213 of FIG. 3.

In one embodiment the fingerprint index 302 is a portion of the metadata 306 on the storage containers 304 and at least a portion of the fingerprint index 302 is stored or cached in memory. The fingerprint index 302 stores information to determine which of the storage containers 304 on which data referenced by a fingerprint is stored. In one embodiment the fingerprint index 302 stores fingerprint data in the form of fingerprint and container identifier pairs (e.g., <FP,CID>) which associate a fingerprint with a container identifier storing the storage segment associated with the fingerprint.

The file segment tree 303 is a portion of the metadata 306 that enables the deduplication file system 300 to reconstruct a file from the underlying data 308. The file segment tree 303 may be referred to as an LP segment tree. In one embodiment the file segment tree 303 is a Merkle tree that may have multiple levels depending on the size of the file. The level zero (L0) segments of the tree are segments with user data. Each L0 segment is identified by a fingerprint, which is one of the fingerprints stored in the fingerprint index 302. The fingerprints are content based fingerprints, such as a hash of the L0 data segment. A level one (L1) segment references one or more L0 segments via content based fingerprints. One or more L1 segments can then be referenced by a level 2 (L2) segment, up to the root node of the tree. Accordingly, the L0 segments contain the data 308 within the storage containers 304. In some embodiments segments in layers L1 and up, referred to as LP segments are also stored in the data 308 and each LP segment also has an associated stored in the metadata 306 and in the fingerprint index 302. Segments can be shared among multiple files and in one embodiment may be compressed and packed within a compression region. Multiple compression regions may be packed into a storage container.

Distributed Bloom Filter Deduplication Garbage Collection

Some embodiments described herein provide for systems and methods of deduplication garbage collection using a set of Bloom filters distributed across multiple compute nodes. A Bloom filter is a space-efficient probabilistic data structure that can be used to test whether an element is a member of a set. Bloom filters are probabilistic in that false positive matches are possible, such that the Bloom filter may return a value that indicates that an element is within the set when the element is not actually within the set. However, false negatives are not possible, so a Bloom filter can be used to determine that an element is definitely not included within a set. The Bloom filter attains space-efficiency by hashing input data using one or more non-cryptographic hashing algorithms that are more collision prone than "error-free" hashing techniques but provide a significant reduction in the amount of storage space required to store the output of the hash function.

Figure 4:
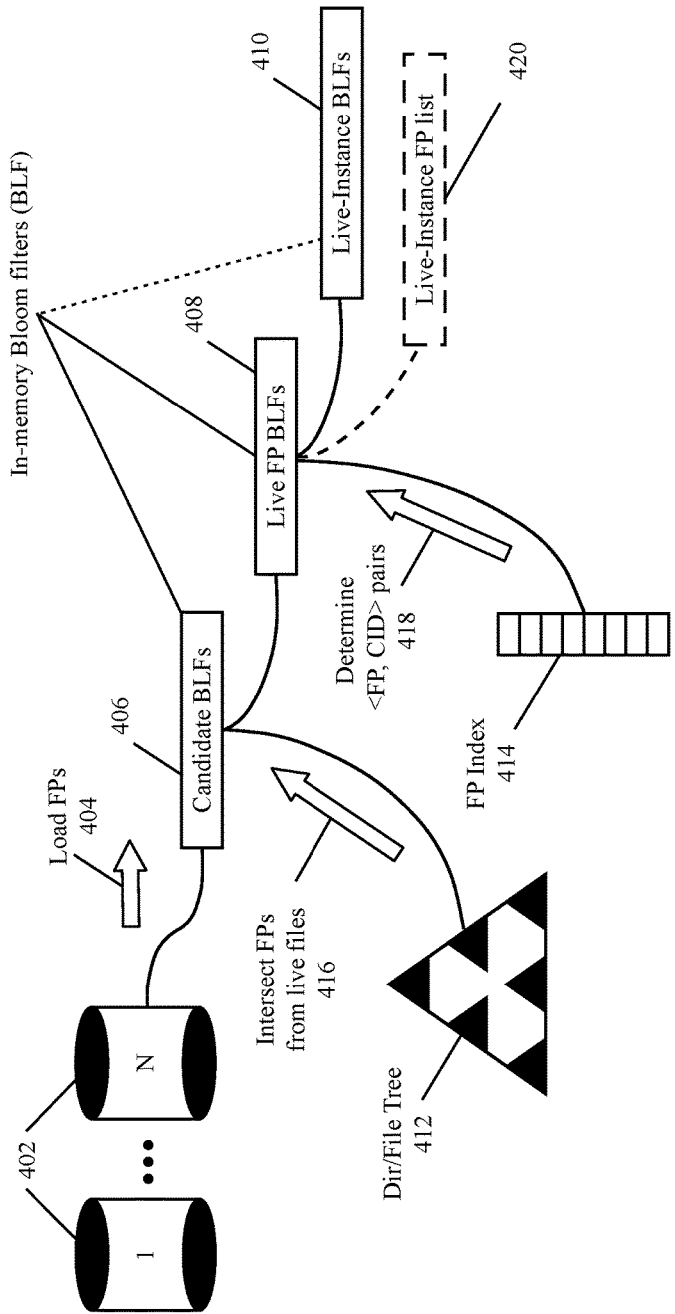
FIG. 4 illustrates deduplication garbage collection data flow, according to an embodiment.

FIG. 4 illustrates deduplication garbage collection data flow 400, according to an embodiment. In one embodiment, the deduplication garbage collection data flow 400 includes processing a subset of the storage containers 402 to determine a set of fingerprints for storage segments stored on the subset of storage containers. Those fingerprints (FPs) are then loaded 404 into a set of candidate Bloom filters 406 that store the set of all fingerprints of data segments contained in the subset of storage containers 402. An operation is performed to intersect 416 the fingerprints in the set of candidate Bloom filters 406 with the fingerprints referenced by any live files stored on the system via directory/file tree 412. The fingerprints of the directory/file tree 412 represents those fingerprints that are in actual use (e.g. live) in the current instance of the data.

The intersection of the fingerprints in the set of candidate Bloom filters 406 can be stored in a separate set of Bloom filters, which may be referred to as live fingerprint Bloom filters 408. Subsequently, a fingerprint index (FP index 414), or a memory resident cache of the fingerprint index, can be used to determine a set of fingerprint and container identifier (CID) pairs 418 that references the newest container that includes a copy of each storage segment referenced by the fingerprint. Each fingerprint and container identifier association (e.g., <FP, CID>) identifies the live instance of a data segment that is in use in the directory/file tree 412.

In one embodiment, the set of <FP, CID> pairs is inserted into a set of live-instance Bloom filters 410 that can be queried during the copy-forward process. For each storage segment in a storage container, the fingerprint for the storage container can be queried against the live-instance Bloom filter 410 associated with the storage container to determine if the segment is to be forwarded to a new container. Once all the live data segments in a container have been copied forward to a new container, the container is deleted and the space reclaimed.

In one embodiment, instead of a set of live-instance Bloom filters 410, a set of one or more live-instance fingerprint lists 420 can be created which explicitly enumerates the set of fingerprints to be copied for each container. In such embodiment, the list of live-instance fingerprints can be directly copied from the storage containers 402.

In one embodiment the set of candidate Bloom filters 406 and live fingerprint Bloom filters are in-memory bloom filters. The set of live-instance Bloom filters 410 may be stored in memory to perform deduplication garbage collection or, in some embodiments, transmitted to a different storage system or distributed among multiple nodes of a storage system, for example, to enable parallel garbage collection of multiple storage containers.

Figure 5:
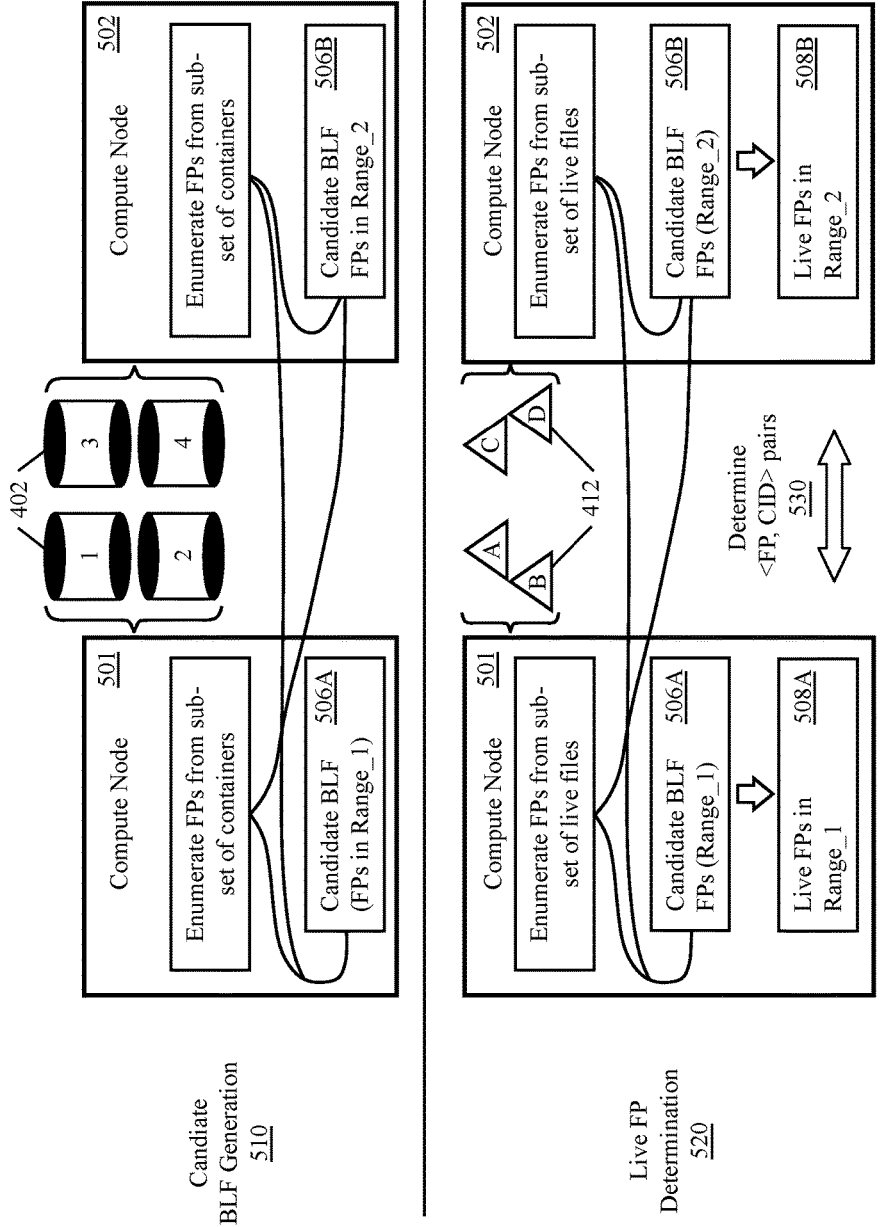
FIG. 5 illustrates distributed Bloom filter deduplication garbage collection, according to an embodiment.

FIG. 5 illustrates a distributed Bloom filter deduplication garbage collection system, according to an embodiment. In one embodiment the distributed Bloom filter deduplication garbage collection system 500 includes a set of storage containers 402 containing storage segments, which are coupled to multiple compute nodes 501, 502. While two compute nodes are illustrated, operations may be performed by more than two compute nodes. In general, the illustrated operations may be performed by any set of multiple compute nodes configured with sufficient aggregate memory capacity to store the set of distributed Bloom filters used during the deduplication garbage collection process. In general, as the number of compute nodes employed is increased, the memory requirement for each individual node is reduced for a given set of storage containers 402.

Operations on the compute nodes 501, 502 occur in multiple stages including at least a candidate Bloom filter generation stage 510 and a live fingerprint determination stage 520. From the set of live fingerprints, a live instance fingerprint list can be generated via an operation 530 to determine a set of fingerprint and container identifier (<FP, CID>) pairs, which can be used to determine the specific set of fingerprints for data in the set of storage containers 402 to be preserved via the copy-forward process.

In one embodiment, the compute nodes 501, 502 perform parallel operations based on a range-based partitioning of the set of fingerprint identifiers. Compute node 501 and compute node 502 are each assigned a range of fingerprints, where compute node 501 is assigned fingerprints in a first range (e.g., Range_1) and compute node 502 is assigned fingerprints in a second range (e.g., Range_2). During the candidate Bloom filter generation stage 510, compute node 501 stores a first candidate Bloom filter 506A in memory, where the first candidate Bloom filter 506A is associated with Range_1. Compute node 502 stores a second candidate Bloom filter 506B in memory, where the second candidate Bloom filter 506B is associated with Range_2. Each compute node 501, 502 can enumerate a subset of the fingerprints of data stored in the set of storage containers 402. The specific storage containers enumerated by each compute node can vary, where each compute node enumerates at least a portion of the fingerprints of data stored in the set of storage containers.

Once each compute node 501, 502 enumerates a set of fingerprints from an associated storage container 402, the compute nodes can load or transmit fingerprints in the enumerated set of fingerprints based on an identifier associated with each fingerprint. For example, for each fingerprint enumerated by compute node 501, the compute node stores the fingerprint into the first candidate Bloom filter 506A if the fingerprint has an identifier in Range_1. Compute node 501 transmits the fingerprint to compute node 502 for storage into the second candidate Bloom filter 506B if the fingerprint has an identifier in Range_2. Compute node 501 can also receive fingerprints having identifiers in Range_1 from compute node 502 for storage into the first candidate Bloom filter 506A. Additionally, compute node 502 stores the fingerprint into the second candidate Bloom filter 506B if the fingerprint has an identifier in Range_2. Compute node 502 transmits the fingerprint to compute node 501 for storage into the first candidate Bloom filter 506A if the fingerprint has an identifier in Range_1. Compute node 502 can also receive fingerprints having identifiers in Range_2 from compute node 501 for storage into the second candidate Bloom filter 506B. The operations of the compute nodes 501, 502 generally occur in parallel, although some operations may be temporarily serialized, for example, for purposes of data integrity.

In one embodiment, during the live fingerprint determination stage 520, each compute node 501, 502 can enumerate fingerprints from a sub-set of live files in a directory/file tree 412 that represents the fingerprints for data segments that are in actual use (e.g. live) in the current instance of the data, for example, via a query of a file segment tree (e.g., file segment tree 303 as in FIG. 3) associated with the directory/file tree 412. Enumeration of fingerprints within the directory/file tree 412 can occur in a manner similar to the enumeration of fingerprints in the set of storage containers 402, with each node performing at least a portion of the enumeration operations. Each compute node 501, 502 can determine an intersection between the fingerprints for the live files of the directory/file tree 412 and the total set fingerprints of storage segments stored on the set of storage containers 402 to generate a list of live fingerprints.

In one embodiment, the live fingerprint determination stage 520 is range based and is performed in a similar manner as the candidate bloom filter generation stage 510, where compute node 501 determines an intersection for fingerprints in Range_1, while compute node 502 determines an intersection for fingerprints in Range_2. Compute node 501 can then generate a list of live fingerprints 508A associated with Range_1, while compute node 502 can generate a list of live fingerprints 508B associated with Range_2. In one embodiment the live fingerprints 508A, 508B are stored Bloom filters as live fingerprint Bloom filters.

Figure 6:
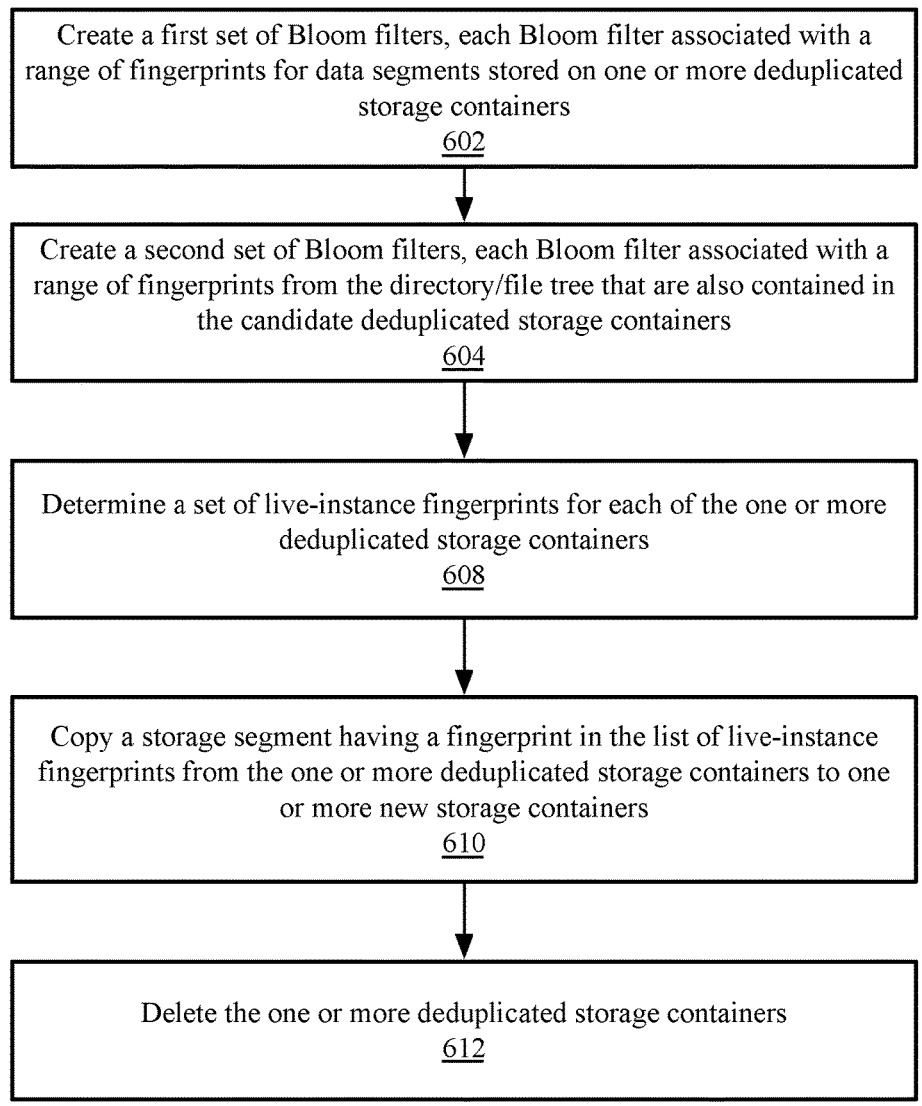
FIG. 6 is a flow diagram illustrating an overview of distributed Bloom filter deduplication garbage collection logic, according to an embodiment.
Figure 7:
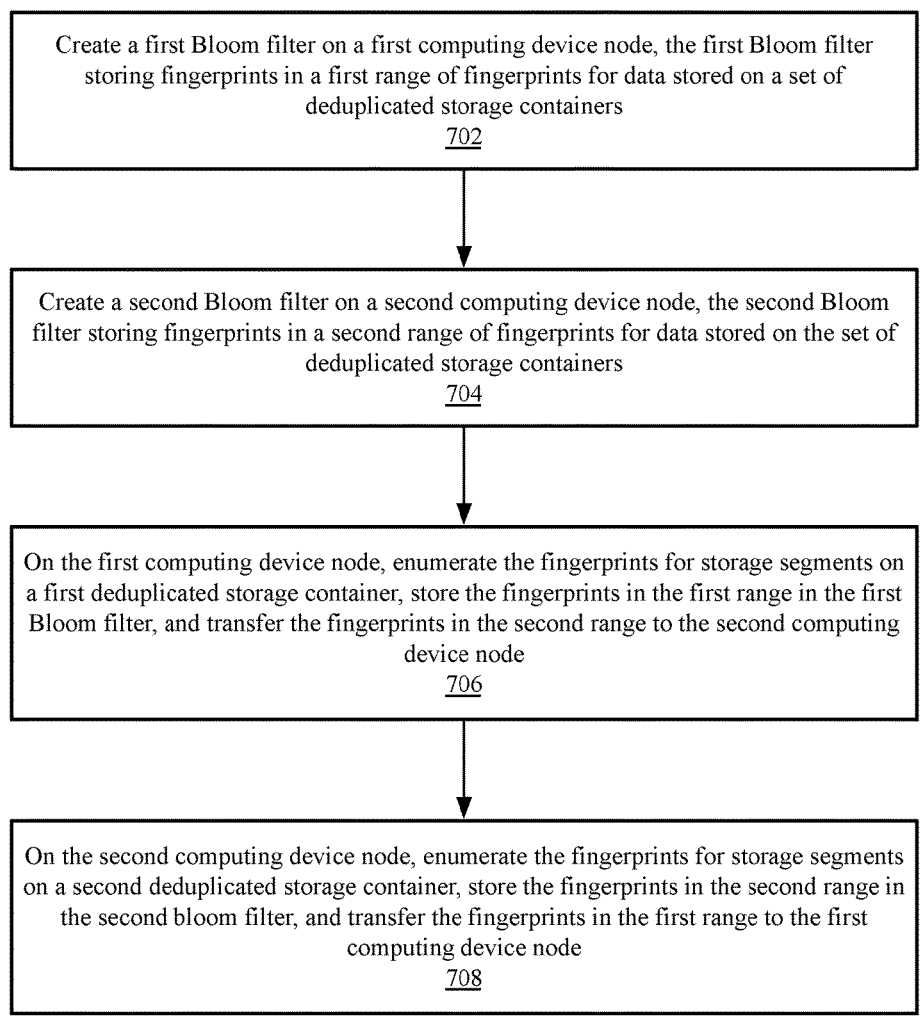
FIG. 7 is a flow diagram illustrating operation of distributed candidate Bloom filter creation logic, according to an embodiment.
Figure 8:
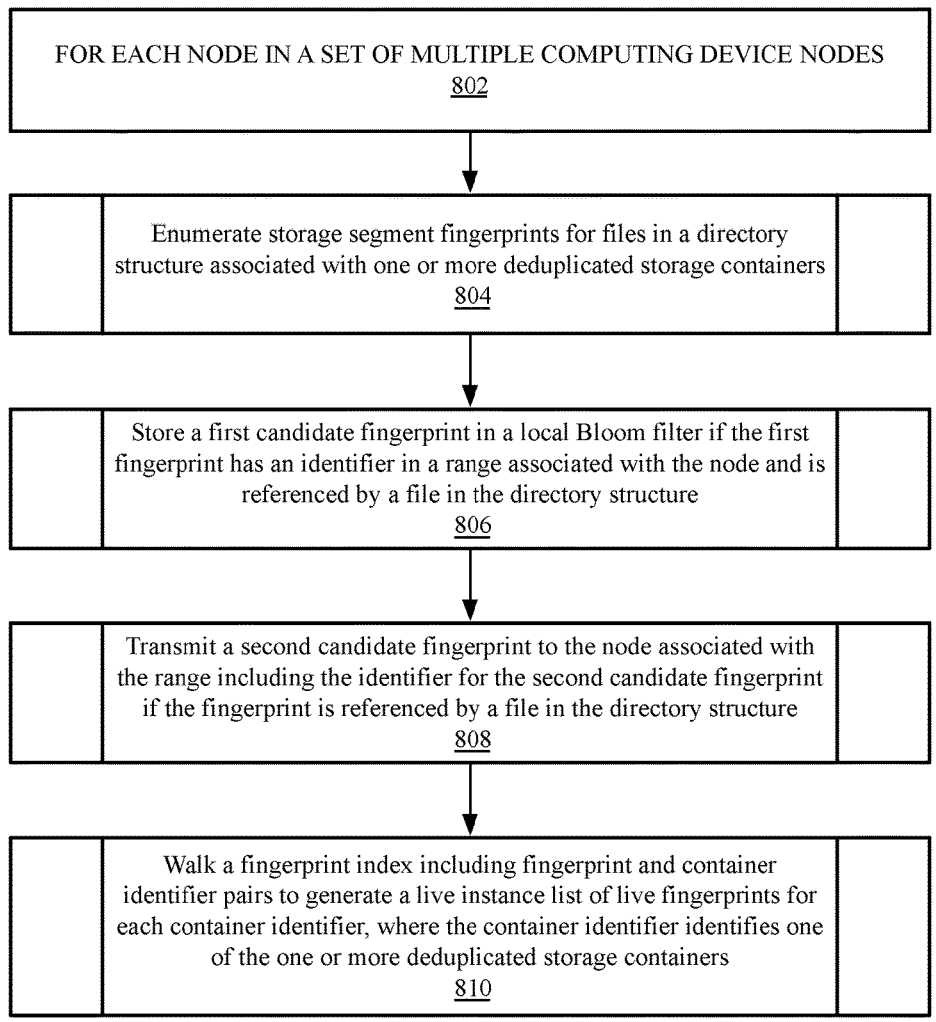
FIG. 8 is a flow diagram illustrating operation of distributed live Bloom filter creation logic, according to an embodiment.

The live fingerprints 508A, 508B can then be used to perform an operation 530 to determine a set of fingerprint and container identifier (<FP, CID>) pairs. For example, a fingerprint index, such as the fingerprint index 302 of FIG. 3, can be queried for each fingerprint to determine which of the storage containers 304 contains the data referenced by the fingerprint. The fingerprint and container identifier pairs can then be used to generate a live instance list or Bloom filter of fingerprints that forms the basis of the collection recipes for each container in the set of storage containers 402. FIGS. 6-8 provide further detail on the underlying logic of the distributed Bloom filter deduplication garbage collection system 500.

FIG. 6 is a flow diagram illustrating an overview of distributed Bloom filter deduplication garbage collection logic 600, according to an embodiment. As described above, at least two sets of distributed Bloom filters are created during distributed Bloom filter deduplication. In various embodiments the distributed Bloom filter deduplication garbage collection logic 600 can execute in a distributed manner across multiple physically networked computational nodes, across multiple compute nodes within a single physical server device, or across multiple virtual compute nodes, which may be located in a single physical server device or distributed across multiple physical server devices.

As shown at block 602, the distributed Bloom filter deduplication garbage collection logic 600 can create a first set of Bloom filters, where each Bloom filter is associated with a range of fingerprints for data segments stored on one or more deduplicated storage containers. In one embodiment the ranges are disjoint and non-overlapping ranges and the ranges are evenly divided among the set of Bloom filters. However, an uneven division may also be used, where certain ranges contain more fingerprints than other ranges. Each Bloom filter in the set of Bloom filters may be associated with a separate virtual or physical computational node, where each node processes fingerprints within an assigned range and each Bloom filter stores fingerprints within the assigned range. The first set of Bloom filters may be referred to as candidate Bloom filters.

As shown at block 604, the distributed Bloom filter deduplication garbage collection logic 600 can create a second set of Bloom filters. The second set of Bloom filters includes a set fingerprints that are correlated with files stored in a file system directory structure. In one embodiment each Bloom filter in the second set of Bloom filters represent a range of the fingerprints from the live/file directory tree that are also contained in the candidate deduplicated storage containers. In one embodiment the directory/file tree defines a logical structure for files within a file system, where the files are logically constructed from the data segments stored on the storage container. For example, directory/file tree can include or reference a file segment tree (e.g., file segment tree 303 of FIG. 3) that stores fingerprints for L0 and LP segments associated with data files in the directory/file tree. The distributed Bloom filter deduplication garbage collection logic 600 can reference the directory/file tree and/or file segment tree to determine the set of fingerprints associated with files currently stored in the directory/file tree. For each fingerprint referenced by the directory/file tree, a membership query can be performed on the appropriate Bloom filter in the first set of Bloom filters to determine if the fingerprint is one of the candidate fingerprints of data segments stored on the set of storage containers currently under analysis. For enumerated fingerprints associated with files in the directory/file tree that are stored in the first set of Bloom filters, those fingerprints can be inserted into a Bloom filter in the second set of Bloom filters. The second set of Bloom filters can be assigned a range of fingerprints in a similar manner as with the first set of Bloom filters. Also, the computational nodes can distribute the workload for the creation of the second set of Bloom filters in the single range per-node manner as with the first set of Bloom filters, such that each Bloom filter in the second set of Bloom filters will ultimately store fingerprints within the range assigned to the Bloom filter. The second set of Bloom filters may be referred to as live fingerprint Bloom filters.

As shown at block 608, the distributed Bloom filter deduplication garbage collection logic 600 can determine a set of live-instance fingerprints for each of the one or more deduplicated storage containers. The set of live-instance fingerprints defines the set of fingerprints and the associated container its data segment is stored in the current set of storage containers and referenced by a file in the directory/file tree. In one embodiment the set of live-instance fingerprints is generated by the distributed Bloom filter deduplication garbage collection logic 600 by walking the fingerprint index (e.g., fingerprint index 302 as in FIG. 3) and performing a membership query into the Bloom filter in the second set of Bloom filters having a range that includes the identifier for the fingerprint. For each fingerprint in the fingerprint index that is in the live fingerprint set defined by the second set of Bloom filters, the logic can insert the fingerprint into the set of live-instance fingerprints. In one embodiment each entry in the set of live-instance fingerprints contains a fingerprint and container identifier (<FP, CID>) pair.

In various embodiments, each <FP, CID> pair can be distributed and inserted into a set of distributed live-instance Bloom filters or file lists sorted by container identifier. In one embodiment a distributed set of live-instance Bloom filters is created, where each Bloom filter includes fingerprints for a single storage container or CID. In one embodiment, a distributed set of live-instance Bloom filters is created, where the live-instance Bloom filters are distributed based on range and the <FP, CID> pair is inserted into the Bloom filter containing the range including the identifier of the fingerprint. In one embodiment an output file or data structure can be generated containing list of live-instance fingerprints sorted by CID. The resulting list or set of Bloom filters of live fingerprints defines or can be used to derive a garbage collection recipe containing the list of live-instance fingerprints for each storage container. The garbage collection recipe can be used to do copy-forward compaction of the storage segments in the existing storage containers.

As shown at block 610, the distributed Bloom filter deduplication garbage collection logic 600 can perform garbage collection operations including to copy a storage segment having a fingerprint in the list of live fingerprints from the one or more deduplicated storage containers to one or more new storage containers. The operation at 610 can be performed for each fingerprint in a list of live-instance fingerprints. Where a live-instance Bloom filter is used, the live-instance Bloom filter associated with a storage container can be used to determine, for each storage segment stored on the storage container, which of the storage segments are to be copied to the new storage container.

As shown at block 612, once the copy-forward process is complete for a storage container, the distributed Bloom filter deduplication garbage collection logic 600 can delete the storage container. In one embodiment multiple compute nodes each perform copy-forward for a different set of storage containers. In one embodiment multiple compute nodes may perform copy-forward operations on a single storage container and the storage container is not deleted until all computational nodes complete copy-forward operations on the storage container.

FIG. 7 is a flow diagram illustrating operation of distributed candidate Bloom filter creation logic 700, according to an embodiment. In some embodiments the creation of the distributed candidate bloom filters is a range-based operation. In such embodiments, each candidate Bloom filter is associated with a separate disjoint range. Portions of the distributed candidate Bloom filter creation logic 700 can be performed in parallel across physical or virtual nodes of a computing system. While the illustrated distributed candidate Bloom filter creation logic 700 describes two computing device nodes and two storage containers, more than two computing devices nodes may be used to process and more than two storage containers may be processed. For example, multiple computing device nodes may process a single storage container or a single computing device node in a set of computing device nodes may be assigned multiple storage containers to process.

As shown at block 702, the distributed candidate Bloom filter creation logic 700 can create a first bloom filter on a first computing device node. The first Bloom filter stores fingerprints in a first range of fingerprints for data stored on a set of deduplicated storage containers as described herein.

As shown at block 704, the distributed candidate Bloom filter creation logic 700 can create a second Bloom filter on a second computing device node. The second Bloom filter stores fingerprints in a second range of fingerprints for data stored on the set of deduplicated storage containers.

As shown at block 706, distributed candidate Bloom filter creation logic 700 on the first computing device node can enumerate the fingerprints for storage segments on a first deduplicated storage container, store the fingerprints in the first range in the first Bloom filter, and transfer the fingerprints in the second range to the second computing device node As shown at block 708, distributed candidate Bloom filter creation logic 700 on the second computing device node can enumerate the fingerprints for storage segments on a second deduplicated storage container, store the fingerprints in the second range in the second Bloom filter, and transfer the fingerprints in the first range to the first computing device node. In this manner the fingerprints can be distributed to the appropriate computing device node for storage in the appropriate Bloom filter based on the identifier of each fingerprint and the ranges associated with each computing device node and Bloom filter. Similar range-based distribution logic may be used to process fingerprints when generating distributed live Bloom filters.

FIG. 8 is a flow diagram illustrating operation of distributed live Bloom filter creation logic 800, according to an embodiment. As indicated at block 802, the distributed live Bloom filter creation logic 800 is illustrated as parallel logic that, in one embodiment, is performed across each node of a set of multiple computing device nodes.

As shown at block 804, each node is configured to enumerate storage segment fingerprints for files in a directory structure associated with one or more deduplicated storage containers for which garbage collection is to be performed.

As shown at block 806, each node is configured to store a first candidate fingerprint in a local Bloom filter if the first fingerprint has an identifier in a range associated with the node and is referenced by a file in the directory structure As shown at block 808, each node is configured to transmit a second candidate fingerprint to the node associated with the range including the identifier for the second candidate fingerprint if the fingerprint is referenced by a file in the directory structure As shown at block 810, each node is configured to walk a fingerprint index including fingerprint and container identifier pairs to generate a live instance list of live fingerprints for each container identifier, where the container identifier identifies one of the one or more deduplicated storage containers.

In one embodiment the range assignments are provided to each node when initializing operations for the node. In one embodiment, the nodes can negotiate node assignments based on a minimum and maximum fingerprint identifier and the number of nodes in the set of multiple computing device nodes. Additionally, similar parallel logic operations to those described in block 804 through block 810 may be used to perform the range-based candidate Bloom filter generation described with respect to FIG. 7, excepting that fingerprints in storage containers are enumerated instead of the fingerprints for files in the directory structure associated with the storage containers as in FIG. 8.

Distributed Out-of-Core Deduplication Garbage Collection

As an alternative to a distributed Bloom filter approach to deduplication garbage collection, some embodiments provide systems to perform a deduplication processing method using out-of-core sorting and file intersection operations. Out-of-core sorting is a method of sorting large data sets that are too large to fit into main memory. Distributed out-of-core sorting distributes the processing operations across a cluster of nodes and then exchanges information between the nodes.

Figure 9:
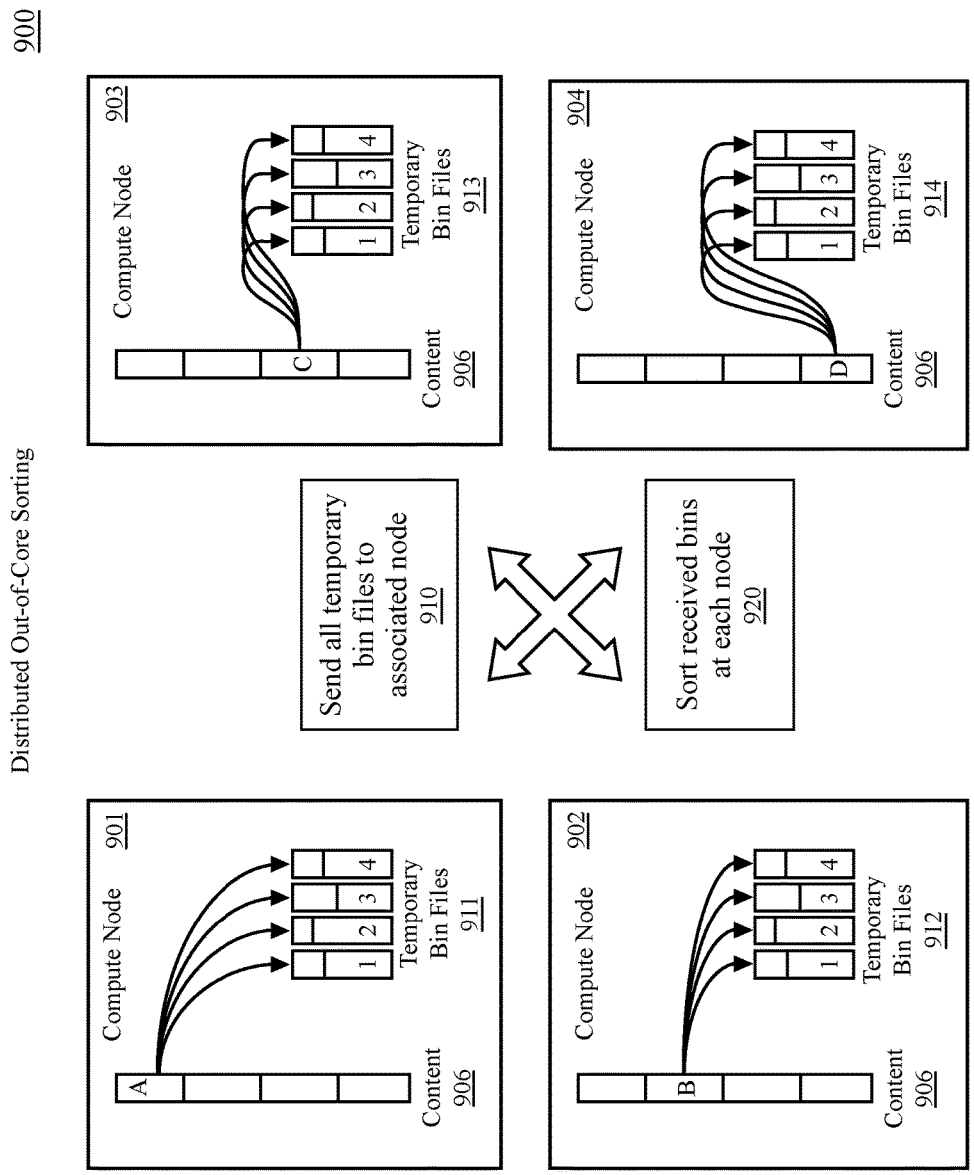
FIG. 9 illustrates a distributed out-of-core sorting algorithm, according to an embodiment.

FIG. 9 illustrates an exemplary distributed out-of-core sorting algorithm 900 according to one embodiment. The exemplary distributed out-of-core sorting algorithm 900 can be performed on a multi-node cluster including compute node 901, compute node 902, compute node 903, and compute node 904. Although four computing nodes are illustrated, embodiments may be performed on distributed and/or multi-node compute clusters having greater than or fewer nodes, where a larger number of nodes enhances the benefits of I/O parallelism realized by the algorithm.

In one embodiment, each compute node 901, 902, 903, 904 walks a subset of content 906 to be sorted and bins subsets of the content into a set of temporary bin files 911, 912, 913, 914 within each node. Each bin within the temporary files contains a subset of the content 906 within a different range of a sort key. Bins are created at each node by distributing a subset of the content 906 into multiple bins, where corresponding bins on each node are associated with the same range. During a first phase of operations, subset A of the content 906 is distributed into a set of temporary bin files 911 on compute node 901. Additionally, subset B of the content 906 is distributed into a set of temporary bin files 912 on compute node 902. Subset C of the content 906 is distributed into a set of temporary bin files 913 on compute node 903. Subset D of the content 906 is distributed into a set of temporary bin files 914 on compute node 904.

After the content is distributed into the bins, a second phase of operations occur including a communication event 910 in which each of the bins in each set of temporary bin files 911, 912, 913, 914 are transferred to a compute node associated with the range of fingerprints contained within the bin file. For example, all bin-1 files may be transferred to compute node 901, all bin-2 files may be transferred to compute node 902, all bin-3 files may be transferred to compute node 903, and all bin-4 files may be transferred to compute node 904.

Once the temporary files are distributed, a third phase of operations occurs including an event 920 in which the compute nodes 901, 902, 903, 904 sort the received bin files. The logical concatenation of the sorted bin files is the sorted content. In one embodiment the illustrated exemplary distributed out-of-core sorting algorithm 900 is performed locally within a datacenter by distributing operations across multiple networked computing nodes or across multiple physical or virtual compute nodes within a physical server. In one embodiment the algorithm is performed remotely using a variety of cloud frameworks known in the art, such as Hadoop® or Spark™ provided by the Apache™ Software Foundation.

Figure 10:
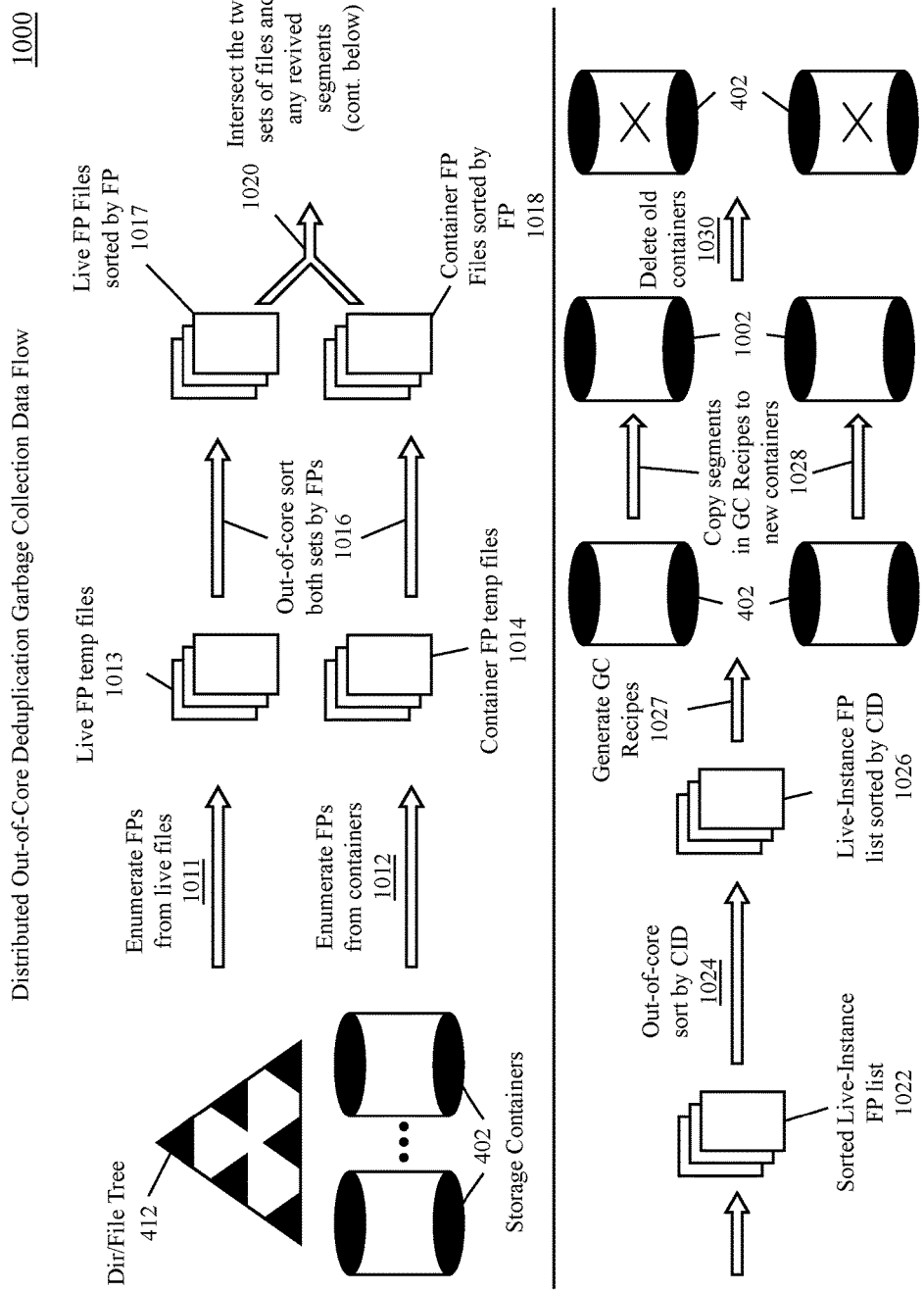
FIG. 10 illustrates a distributed out-of-core deduplication garbage collection data flow, according to an embodiment.

FIG. 10 illustrates a distributed out-of-core deduplication garbage collection data flow, according to an embodiment. The distributed out-of-core deduplication garbage collection dataflow 1000 includes parallel enumeration of fingerprints in the directory/file tree 412 and fingerprints (FPs) in the set of one or more storage containers 402. The directory/file tree 412 and the storage containers 402 can each be analogized to the content 906 of FIG. 9. The distributed out-of-core deduplication garbage collection dataflow 1000 includes operations to group enumerated fingerprints by range within sets of temporary files and then sort the temporary files using the fingerprint as a sort-key. In one embodiment, a first phase of operations occur in which deduplication garbage collection logic distributed across multiple compute nodes perform a set of operations 1011 to enumerate fingerprints from the live files of the directory/file tree 412 and output a first set of temporary files 1013. In parallel, the multiple compute nodes can perform a set of operations 1012 to enumerate fingerprints from the set of one or more storage containers 402 and output a second set of temporary files 1014. The first set of temporary files 1013 contain fingerprints of live files in the directory/file tree 412. The second set of temporary files 1014 contain fingerprints from the set of one or more storage containers 402. Each set of temporary files 1013, 1014 includes a temporary file associated with a specific range of fingerprints and 1013, 1014 can be analogized to multiple, separate instances of the temporary bin files 911, 911, 912, 913 of FIG. 9.

A second and third phase of operations can occur in which out-of-core sort operations 1016 are performed on the sets of temporary files 1013, 1014. During the out-of-core sort operations 1016, the temporary files in the sets of temporary files 1013, 1014 can be exchanged between the multiple compute nodes and then sorted by the multiple compute nodes to generate a first set of sorted files 1017 containing sorted live fingerprints and a second set of sorted files 1018 containing sorted container fingerprints. The sorted fingerprints in each of the sets of sorted files 1017, 1018 can be intersected in an intersection operation 1020 to intersect the two sets of files. In one embodiment, prior to the intersection operation 1020, a set of revived segments can be determined. Revived segment are storage segments that were not live when the deduplication garbage collection operation begins, but became live at some point during the deduplication garbage collection, for example, after creation of the set of temporary files 1013 storing the live fingerprints. The intersection operation 1020 can be performed using the live fingerprint files as well as the revived segments.

The set of fingerprints generated by the intersection of the sets of sorted files 1017, 1018 can be stored in a sorted live instance fingerprint list 1022, which may be stored in a single file or distributed in multiple files across the multiple compute nodes. The sorted live instance fingerprint list 1022 includes the <FP, CID> pairs that represent the instances of the data segments to copy-forward during the copy-forward phase of deduplication garbage collection. In one embodiment the sorted live instance fingerprint list 1022 can undergo an out-of-core sorting operation 1024 in which the <FP, CID> pairs are sorted using the container identifier as the sort key to generate a live-instance fingerprint list 1026 that is sorted by container identifier. In one embodiment the live-instance fingerprint list 1026 is fully sorted using the container identifier as a primary sort key and the fingerprint as a secondary sort key. In one embodiment the live-instance fingerprint list 1026 is arranged such that all entries having the same container identifier are place into their own file, where the fingerprints within each file need not be re-sorted. The live-instance fingerprint list 1026 can be used as the basis to generate garbage collection (GC) recipes 1027, which are lists of fingerprints for storage segments to be copied to a new storage container during a copy-forward operation 1028. During the copy-forward operation 1028, segments listed in the garbage collection recipes are copied to a new set of storage containers 1002. Once the copy-forward operation 1028 is complete, the set of multiple compute nodes can then perform operations 1030 to delete the old storage containers.

Figure 11:
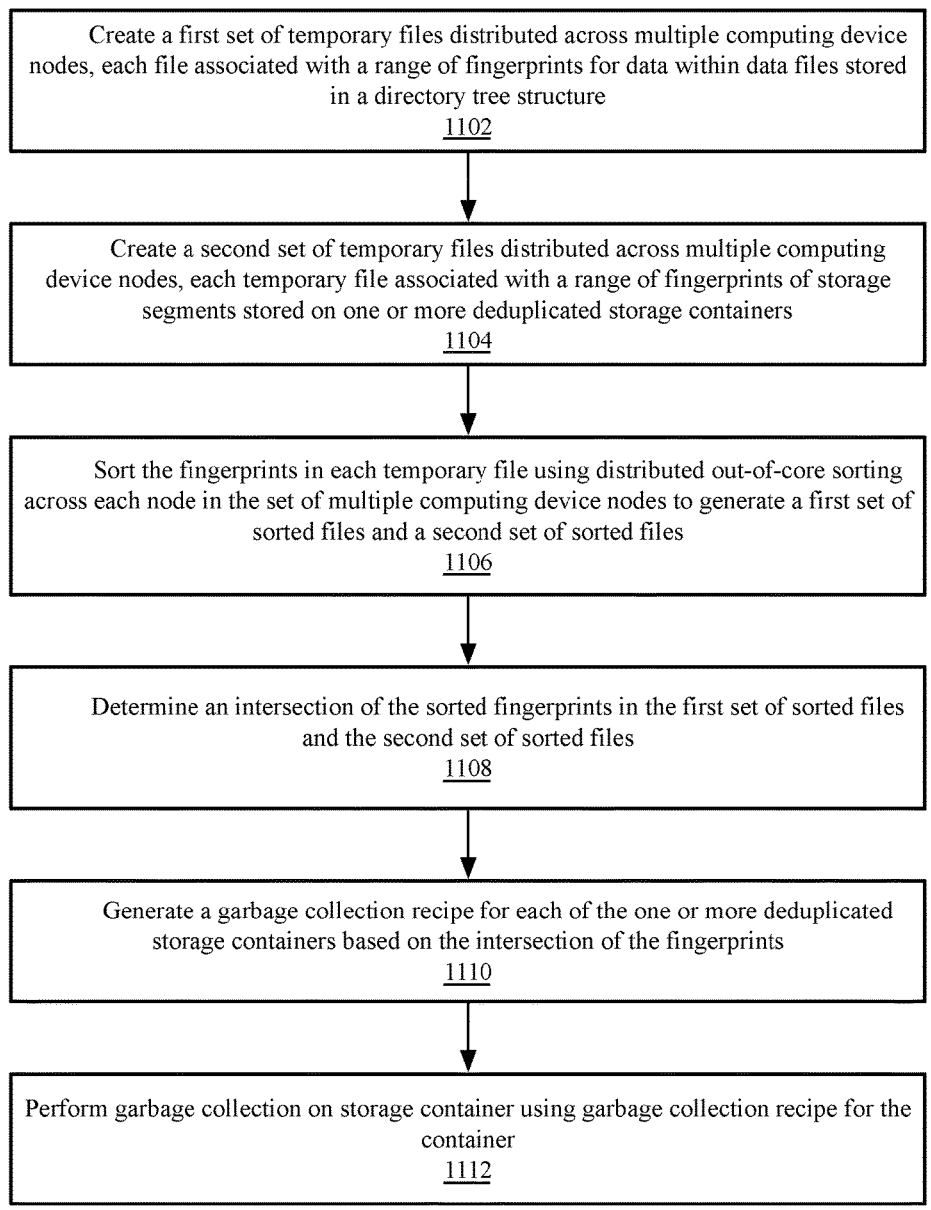
FIG. 11 is a flow diagram illustrating distributed out-of-core deduplication garbage collection logic, according to an embodiment.

FIG. 11 is a flow diagram illustrating distributed out-of-core deduplication garbage collection logic 1100, according to an embodiment. In one embodiment, distributed out-of-core deduplication garbage collection logic 1100 can be performed on a set of multiple computing devices, which may be physical, logical, or virtual computing devices. The distributed out-of-core deduplication garbage collection logic 1100 can also be performed via a remote and distributed cloud compute framework. In one embodiment, operations of the distributed out-of-core deduplication garbage collection logic 1100 can be performed as follows.

As shown at block 1102, the logic can create a first set of temporary files that are distributed across multiple computing device nodes, where each file is associated with a range of fingerprints for data within data files stored in a directory tree structure. As shown at block 1104, the logic can create a second set of temporary files distributed across multiple computing device nodes, where each temporary file is associated with a range of fingerprints of storage segments stored on one or more deduplicated storage containers. The first and second set of temporary files can be created by enumerating fingerprints stored in a file segment tree associated with a directory/file tree and stored in metadata of the deduplicated storage containers. Where the logic is performed by remote computing devices the set of fingerprints can be locally enumerated and transmitted to the remote computing devices for processing.

As shown at block 1106, the logic can sort the fingerprints in each temporary file using distributed out-of-core sorting across each node in the set of multiple computing device nodes to generate a first set of sorted files and a second set of sorted files. In one embodiment the distributed out-of-core sorting is performed as described with respect to FIG. 10 using the distributed out-of-core sorting algorithm 900 of FIG. 9, although other embodiments may use a variant of the illustrated algorithm or a different I/O parallel out-of-core sorting algorithm.

As shown at block 1108, the logic can determine an intersection of the fingerprints in the first set of sorted files and the second set of sorted files. This intersection can be stored in a single file or distributed across multiple files. In one embodiment the intersection includes <FP, CID> pairs that uniquely identifies a specific fingerprint on a specific storage container.

As shown at block 1110, using the intersection of fingerprints and an associated container identifier for each fingerprint, the logic can generate a garbage collection recipe for each of the one or more deduplicated storage containers based on the intersection of the fingerprints. The garbage collection recipes for each storage container, can be used to perform garbage collection on storage container, as shown at block 1112.

Figure 12:
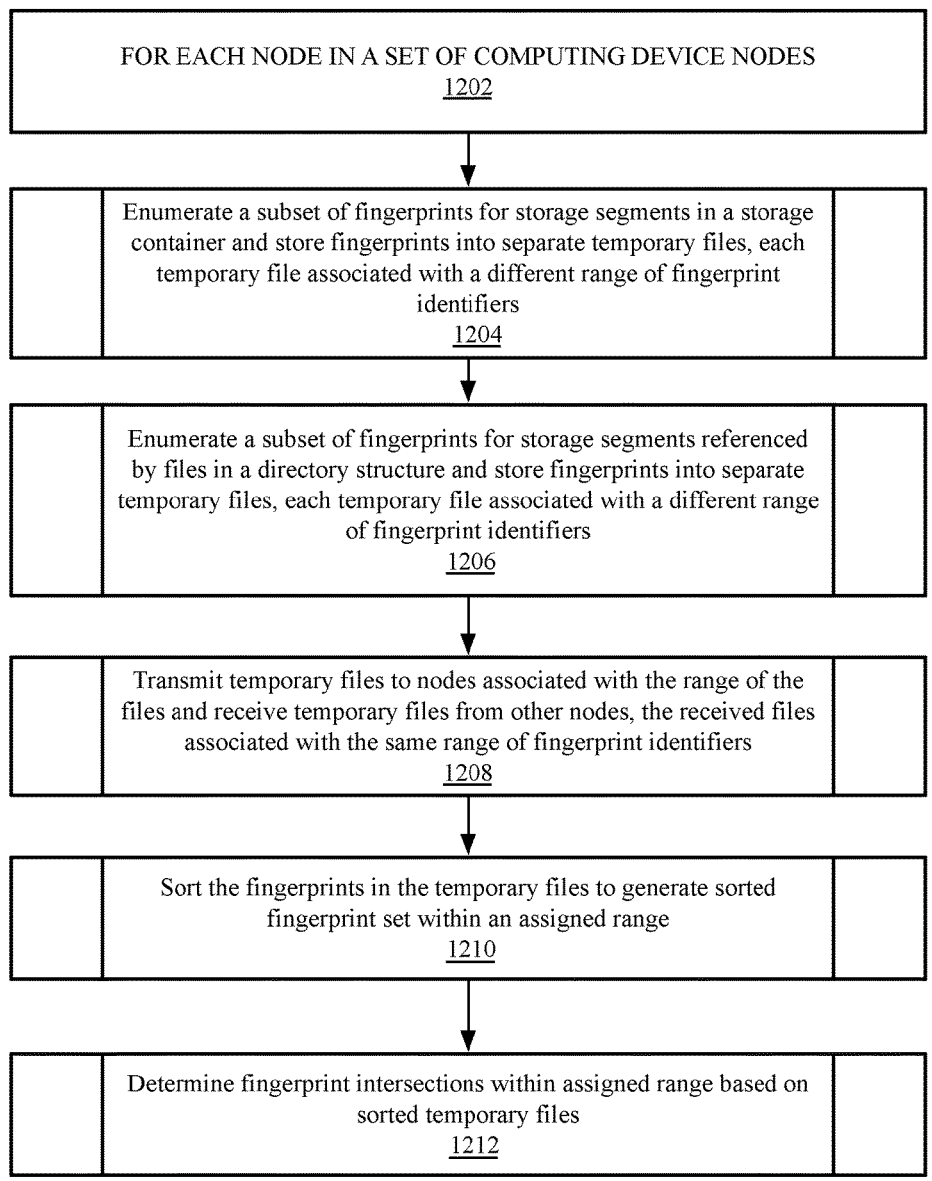
FIG. 12 is a flow diagram illustrating distributed out-of-core fingerprint sorting and correlation logic, according to an embodiment.

FIG. 12 is a flow diagram illustrating distributed out-of-core fingerprint sorting and correlation logic 1200, according to an embodiment. As indicated at block 1202, the distributed out-of-core fingerprint sorting and correlation logic 1200 is illustrated as parallel logic that, in one embodiment, is performed across each node of set of multiple computing device nodes.

As shown in block 1204, the distributed out-of-core fingerprint sorting and correlation logic 1200 enumerates a subset of fingerprints for storage segments in a storage container and store the fingerprints into separate temporary files, where each temporary file is associated with a different range of fingerprint identifiers.

As shown in block 1206, the logic enumerates a subset of fingerprints for storage segments referenced by files in a directory structure and stores the fingerprints into separate temporary files, where each temporary file is associated with a different range of fingerprint identifiers.

As shown at block 1208, the logic transmits temporary files to nodes associated with the range of the files and receives temporary files from other nodes, where the received files are each associated with the range of fingerprint identifiers associated with the receiving node. At block 1210, at each of the multiple computing device nodes, the logic sorts the fingerprints in the temporary files to generate a sorted fingerprint set within an assigned range.

As shown at block 1212, the logic then determines fingerprint intersections between the sets of sorted temporary files within assigned range. The fingerprint intersections can be used to generate garbage collection recipes to perform garbage collection on the deduplicated storage containers.

Figure 13:
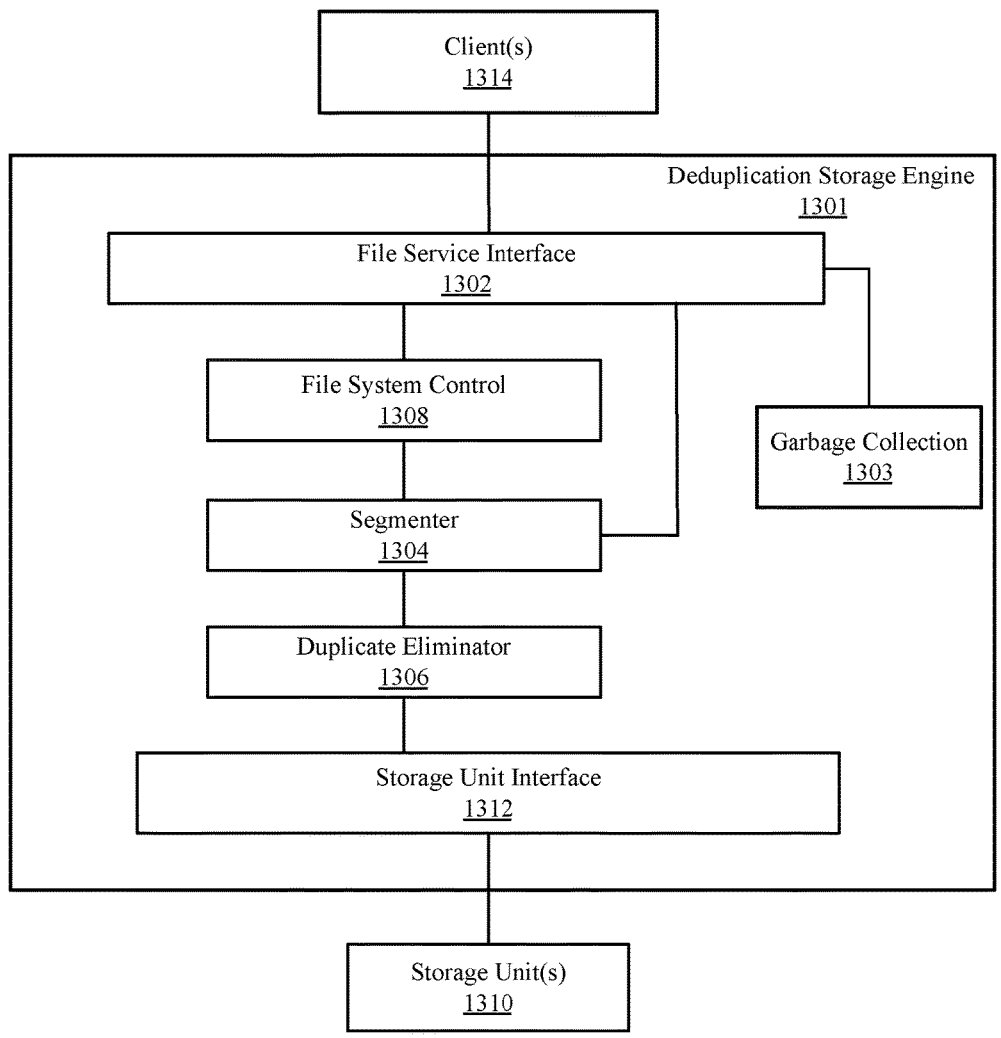
FIG. 13 is an block diagram illustrating a deduplication storage engine with a garbage collection service, according to an embodiment.

FIG. 13 is a block diagram illustrating a deduplication storage system 1300 with a garbage collection service, according to one embodiment of the invention. The deduplication storage system 1300 may be implemented as part of a deduplication storage system as described above, such as, for example, a deduplication storage system as implemented for a storage system as in FIG. 1 or FIG. 2 or a client as in FIG. 2. The deduplication storage system 1300 may have a distributed architecture, or all of its components may be integrated into a single unit and can be implemented as part of an archive and/or backup system.

In one embodiment the deduplication storage system 1300 includes a deduplication storage engine 1301 interfacing with one or more clients 1314. The clients 1314 may be any kinds of clients, such as, for example, a client application, backup software, or a garbage collector, located locally or remotely over a network. The deduplication storage engine 1301 also interfaces with one or more storage units 1310 storing metadata and data objects of the deduplicated storage containers described herein. Storage units 1310 may be implemented locally (e.g., single node operating environment) or remotely (e.g., multi-node operating environment) via an interconnect, which may be a bus and/or a network (e.g., a storage network). In one embodiment, one of the storage units 1310 operates as an active storage to receive and store external or fresh user data from a client (e.g., an end-user client or a primary storage system associated with one or more end-user clients), while the another one of storage units 1310 operates as a target storage unit to periodically archive data from the active storage unit according to an archiving policy or scheme. Storage units 1310 may be storage devices such as magnetic disks, optical disks such as CD-ROM or DVD based storage, magnetic tape storage, magneto-optical (MO) storage media, solid state disks, flash memory devices, or any other type of non-volatile storage devices suitable for storing large volumes of data. The storage units 1310 may also be combinations of such devices. In the case of disk storage media, the storage units 1310 may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding: a reference to a chunk plus a difference; etc.). In one embodiment, different storage units may use different compression methods (e.g., main or active storage unit from other storage units, one storage unit from another storage unit, etc.).

In one embodiment the deduplication storage engine 1301 includes a file service interface 1302, a segmenter 1304, a duplicate eliminator 1306, a file system control unit 1308, and a storage unit interface 1312. The deduplication storage engine 1301 receives a file or files (or data item(s)) via a file service interface 1302, which may be part of a file system namespace of a file system associated with the deduplication storage engine 1301. The file system namespace refers to the way files are identified and organized in the system. An example is to organize the files hierarchically into directories or folders, which may be managed by a directory manager. The file service interface 1302 supports a variety of protocols, including a network file system (NFS), a common Internet file system (CIFS), and a virtual tape library interface (VTL), etc.

The file(s) is/are processed by a segmenter 1304 and a file system control unit 1308. The segmenter 1304, which may also be referred to as a content store, breaks the file(s) into variable-length chunks based on a variety of rules or considerations. For example, the file(s) may be broken into chunks by identifying chunk boundaries. Chunk boundaries may be determined using file boundaries, directory boundaries, byte counts, content-based boundaries (e.g., when a hash of data in a window is equal to a value), or any other appropriate method of determining a boundary. Reconstruction of a data block, data stream, file, or directory includes using one or more references to the one or more chunks that originally made up a data block, data stream, file, or directory that was/were previously stored.

In some embodiments, chunks are segmented by identifying chunk boundaries that are content-based—for example, a hash function is applied to values of data within a sliding window through the data stream or block and when the hash function is equal to a value (or equal to one of several values) then a chunk boundary is identified. In various embodiments, chunk boundaries are identified using content based functions operating on windows within a data stream or block that have a minimum or maximum or other value or any other appropriate content based chunking algorithm. In various embodiments, chunks include fixed-length chunks, variable length chunks, overlapping chunks, non-overlapping chunks, chunks with a minimum size, chunks with a maximum size, or any other appropriate chunks. In various embodiments, chunks include files, groups of files, directories, a portion of a file, a portion of a data stream with one or more boundaries unrelated to file and/or directory boundaries, or any other appropriate chunk.

In one embodiment, file system control unit 1308, also referred to as a file system manager, processes information to indicate the chunk(s) association with a file. In some embodiments, a list of fingerprints is used to indicate chunk(s) associated with a file. File system control unit 1308 passes chunk association information (e.g., representative data such as a fingerprint) to an index. The Index is used to locate stored chunks in storage units 1310 via storage unit interface 1312. The duplicate eliminator 1306, also referred to as a segment store, identifies whether a newly received chunk has already been stored in storage units 1310. In the event that a chunk has already been stored in storage unit(s), a reference to the previously stored chunk is stored, for example, in a chunk tree associated with the file, instead of storing the newly received chunk. A chunk tree of a file may include one or more nodes and each node represents or references one of the deduplicated chunks stored in storage units 1310 that make up the file. Chunks are then packed by a container manager (which may be implemented as part of storage unit interface 1312) into one or more storage containers stored in storage units 1310. The deduplicated chunks may be further compressed into one or more CRs using a variation of compression algorithms, such as a Lempel-Ziv algorithm before being stored. A container may contain one or more CRs and each CR may contain one or more deduplicated chunks (also referred to deduplicated segments). A container may further contain the metadata such as fingerprints, sketches, type of the data chunks, etc. that are associated with the data chunks stored therein.

When a file is to be retrieved, the file service interface 1302 is configured to communicate with the file system control unit 1308 to identify appropriate chunks stored in storage units 1310 via the storage unit interface 1312. Storage unit interface 1312 may be implemented as part of a container manager. The file system control unit 1308 communicates (e.g., via segmenter 1304) with an index to locate appropriate chunks stored in storage units via storage unit interface 1312. Appropriate chunks are retrieved from the associated containers via the container manager and are used to construct the requested file. The file is provided via the file service interface 1302 in response to the request. In one embodiment the file system control unit 1308 utilizes a segment tree to associate a file with data chunks and their locations in storage unit(s). In the event that a chunk associated with a given file or file changes, the content-based identifiers will change and the changes will ripple from the bottom to the top of the tree associated with the file efficiently since the appropriate content-based identifiers are easily identified using the tree structure.

In one embodiment the file service interface 1302 communicates with a garbage collection module 1303 that contains logic to perform the deduplication garbage collection techniques described herein, including distribute Bloom filter and distributed out-of-core deduplication garbage collection. The garbage collection module 1303 includes modular logic that may performed by a distributed computing system of multiple computational nodes, enabling garbage collection operations to be performed by deduplication storage engines 1301 on multiple computing devices. The garbage collection module 1303 can couple to a cloud services framework to perform deduplication garbage collection or can be used to implement on-premise garbage collection within a data center. The garbage collection module 1303 can work with the deduplication storage engine 1301 to coordinate operations including access to container metadata, access to file recipes stored in file segment trees, and tracking segments which were revived while GC was processing. Container metadata and file recipes can be accessed directly from a storage repository or through an API communicating with the deduplication storage engine. In one embodiment, a garbage collection module 1303 on one set of computing devices has direct access to the storage units 1310 and associated container file recipes metadata, enabling the garbage collection module to perform processing operations, such as the distributed deduplication garbage collection, distributed out-of-core deduplication garbage collection, or a deduplication garbage collection method known in the art, to generate a garbage collection recipe to be performed by garbage collection module 1303 on a different system or set of systems. In one embodiment the garbage collection module 1303 can receive a remotely generated garbage collection recipe and locally perform copy-forward operations on deduplicated storage containers on the storage units 1310.

Various implementations of the distributed deduplication garbage collection techniques may be realized. A few exemplary distributed deduplication garbage collection implementations are described below.

Exemplary Distributed Deduplication Garbage Collection Implementations

Figure 14:
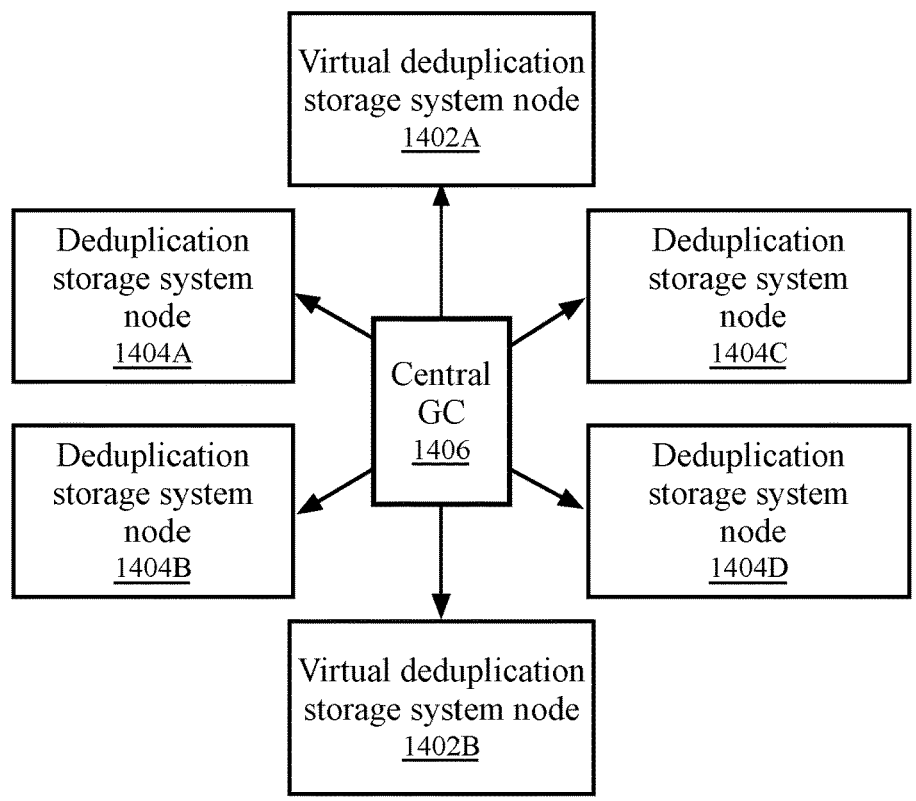
FIG. 14 is a block diagram illustrating distributed replication with centralized garbage collection, according to an embodiment.

FIG. 14 is a block diagram illustrating a distributed replication with centralized garbage collection system 1400, according to an embodiment. The illustrated system includes multiple deduplication storage system nodes including multiple virtual deduplication storage system nodes 1402A, 1402B and/or multiple physical deduplication storage system nodes 1404A-1404D. In a conventional deduplication storage system implementation, each of the deduplication storage system nodes perform garbage collection individually on deduplicated storage containers on connected storage units. Typically a garbage collection operation on a single node can be performed within a single day and runs approximately one per week. In some implementations the garbage collection process is the single largest consumer of processor and memory resources for each node and dictates the resource requirement for each node. Accordingly, each node is over-provisioned with processor and memory resources to enable the nodes to perform garbage collection without interfering with other operations on the node.

In one embodiment, a central garbage collection (GC) node 1406 is provided to offload garbage collection operations for each connected physical or virtual deduplication storage system node. The central GC node 1406 can be provisioned with sufficient resources to perform garbage collection operations serially on each of the virtual deduplication storage system nodes 1402A, 1402B and each of the physical deduplication storage system nodes 1404A-1404D and the resources for each of the nodes can be reduced to the processing and memory resources required to perform storage system operations other than garbage collection.

In one embodiment garbage collection operations are coordinated via a API that enables the central GC node 1406, the virtual deduplication storage system nodes 1402A, 1402B, and/or the multiple physical deduplication storage system nodes 1404A-1404D to request or schedule deduplication garbage collection operations. In one embodiment, deduplication garbage collection is coordinated such that the central GC node 1406 is configured to perform garbage collection operations in an order based on a fullness factor or a potential amount of space that may be reclaimed from one or more deduplicated storage containers associated with the set of multiple computing devices. In one embodiment the fullness factor is used to indicate the percentage of total capacity used for a given storage unit or deduplication storage container. The potential amount of space that may be reclaimed from one or more deduplicated storage containers can vary based on the amount of unreferenced storage segments that are stored in the storage container.

Figure 15:
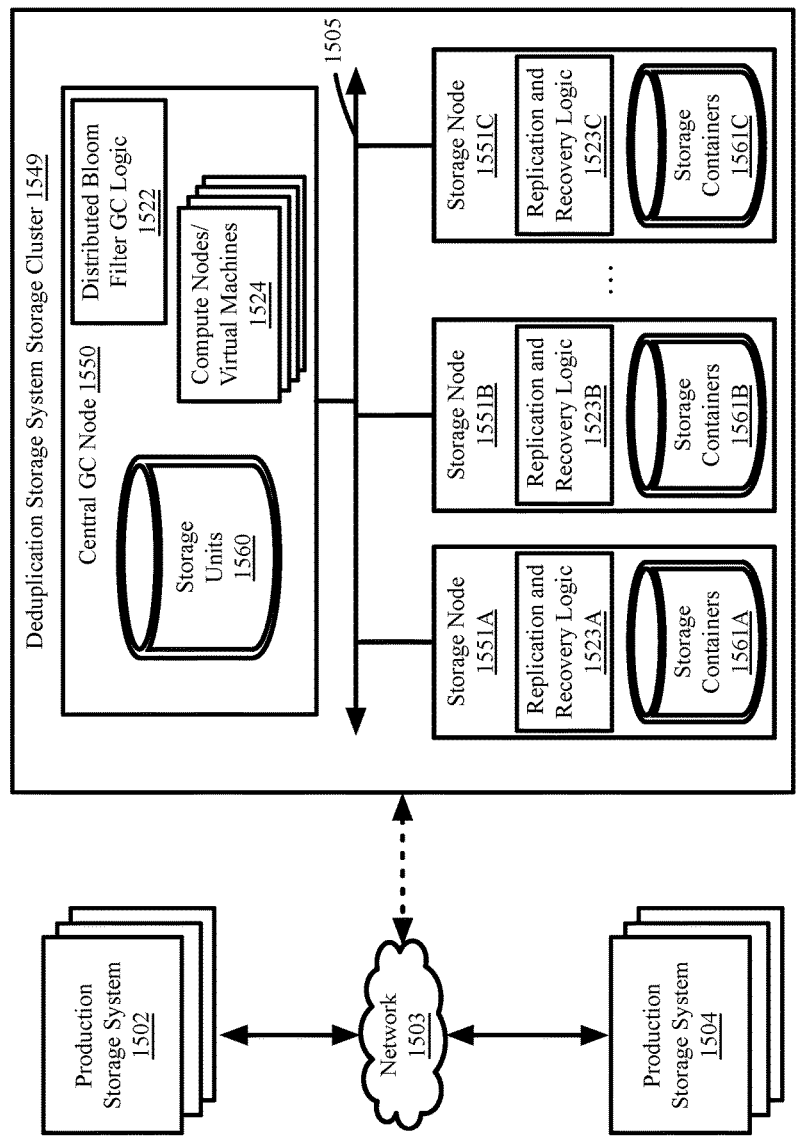
FIG. 15 is a block diagram illustrating a replication compute node cluster with distributed replication replicator nodes and a centralized garbage collection node, according to an embodiment.

FIG. 15 is a block diagram illustrating a deduplication storage system 1500 with distributed centralized garbage collection, according to an embodiment. In one embodiment the deduplication storage system 1500 services a set of production storage systems including a production storage system 1502 and production storage system 1504. The production storage systems 1502, 1504 each couple to a network 1503.

The deduplication storage system 1500 can implement a centralized garbage collection system as illustrated in FIG. 14 via a deduplication storage system storage cluster 1549 connected to the network 1503. The deduplication storage system storage cluster 1549 can connect to the network 1503 via a local (e.g., LAN) connection or a remote (e.g., WAN) connection. In one embodiment the deduplication storage system storage cluster 1549 includes a central garbage collection (GC) node 1550 including distributed Bloom filter GC logic 1522 and physical compute nodes or virtual machines 1524 configured to implement the distributed Bloom filter GC logic 1522. In one embodiment the distributed Bloom filter GC logic 1522 configures the compute nodes or virtual machines 1524 to perform the distributed Bloom filter deduplication garbage collection as described in FIG. 4 through FIG. 8. However, other embodiments may use a variant of the distributed Bloom filter deduplication garbage collection logic or a deduplication garbage collection technique known in the art.

The compute nodes or virtual machines 1524 can be physical compute nodes including multiple processors, each processor including multiple processor cores. In one embodiment the multiple processor cores of the multiple processors can be configured to execute one or more virtual machines including deduplication garbage collection logic. The central GC node 1550 additionally includes one or more storage units 1560, which may used to cache the storage containers 1561A-1561C of the storage nodes 1551A-1551C during deduplication garbage collection.

While distributed Bloom filter GC logic 1522 is illustrated in FIG. 15, in one embodiment the one or more storage units 1560 are multiple storage units and the compute nodes or virtual machines 1524 can perform distributed out-of-core deduplication garbage collection operations using the storage units 1560.

The central GC node 1550 can couple to a local network 1505 to connect to the multiple storage nodes 1551A-1551C, each storage node including or managing one or more storage containers 1561A-1561C on local or adjacent storage devices. The storage nodes 1551A-1551C can include replication and recovery logic 1523A-1523C, which provides backup, backup replication, and/or backup recovery services to production storage system 1502 and/or production storage system 1504.

Figure 16:
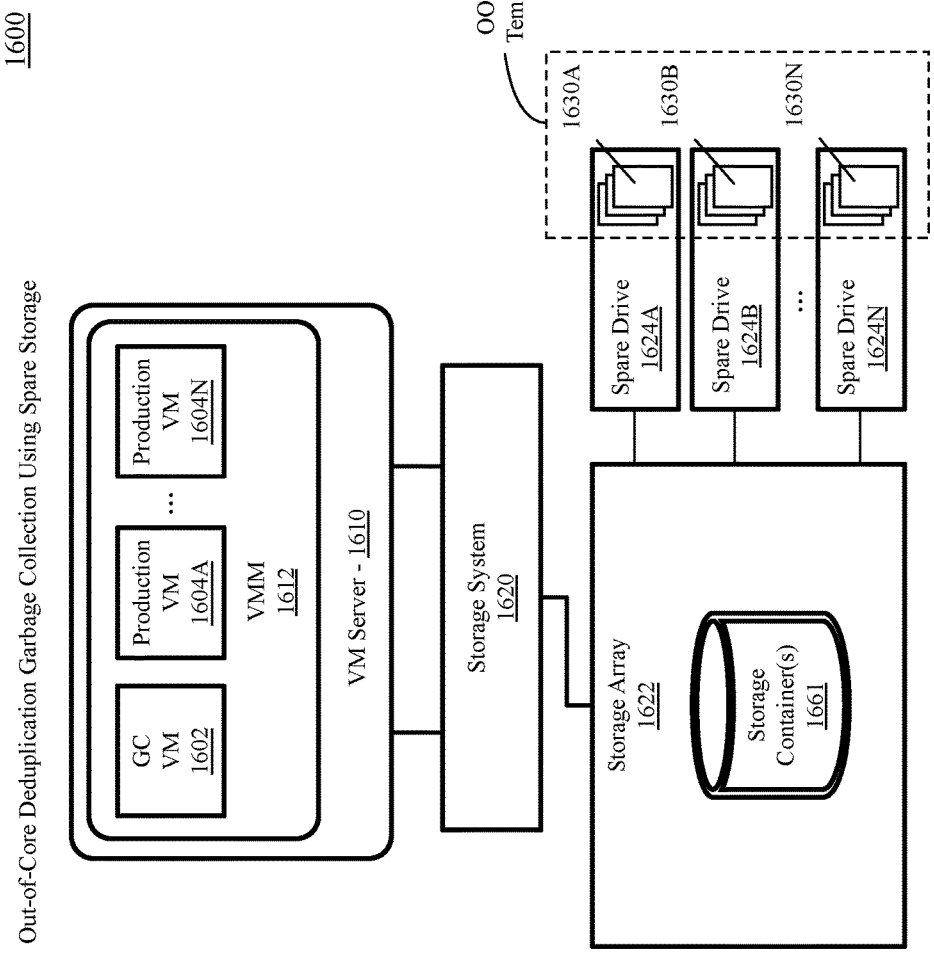
FIG. 16 illustrates out-of-core garbage collection using spare storage, according to an embodiment.

FIG. 16 illustrates out-of-core deduplication garbage collection system 1600 using spare storage, according to an embodiment. In one embodiment the out-of-core deduplication garbage collection system 1600 includes a virtual machine (VM) server 1610 configured to execute a virtual machine manager (VMM) 1612, also referred to as a hypervisor. In one embodiment the VMM 1612 manages execution for a garbage collection (GC) VM 1602 that includes deduplication garbage collection logic. The VMM 1612 can also execute any number of production VMs 1604A though 1604N, which may perform operations similar to the production storage systems 1502, 1504 of FIG. 15.

The VM server 1610 can connect to a storage system 1620 that manages a storage array 1622. The storage array includes one or more deduplicated storage container(s) 1661 for which garbage collection operation are to be performed. The storage array 1622 couples to a number of spare drives 1624A-1624N. The spare drives 1624A-1624N may be any active but unused storage device, such as a hot spare storage devices as in a RAID (redundant array of independent disks) array. In general, hot spares may be used in storage arrays configured for RAID 6, 5, 3, 1, or 1/0. However, embodiments are applicable to any redundant storage system in which a spare drive is available for automatic failover and/or reconstruction of the storage array in the event of a storage device failure. The spare drives 1624A-1624N represent any spare non-volatile storage resources available to the storage array 1622, and may be magnetic disks, flash memory storage, or any storage device suitable for use as spare storage for the storage array 1622.

In one embodiment, the out-of-core deduplication garbage collection system 1600 is configured to perform distributed out-of-core deduplication garbage collection using the GC VM 1602. The temporary storage space used by the distributed garbage collection process can be provided by the spare drives 1624A-1624N. When performing deduplication garbage collection on the storage container(s) 1661, the GC VM 1602 can distribute out-of-core GC temporary files 1630A-1630N across the spare drives 1624A-1624N. In the event of a drive failure during an out-of-core deduplication garbage collection process, the garbage collection process can be aborted and the spare drives 1624A-1624N can be immediately repurposed to rebuild the storage array 1622.

While a VM server 1610 is illustrated, in some embodiments the garbage collection process can also be run on physical resources of the VM server 1610 rather than in the GC VM 1602 or on physical resources on the storage system 1620, using the free storage resources available to the physical server. For example, the storage array 1622 and spare drives 1624A-1624N may also be available for non-virtualized use by the VM server 1610. A garbage collection module such as the garbage collection module 1303 of FIG. 13 can execute on physical processing resources of the VM server 1610 to perform deduplication garbage collection operations.

Figure 17:
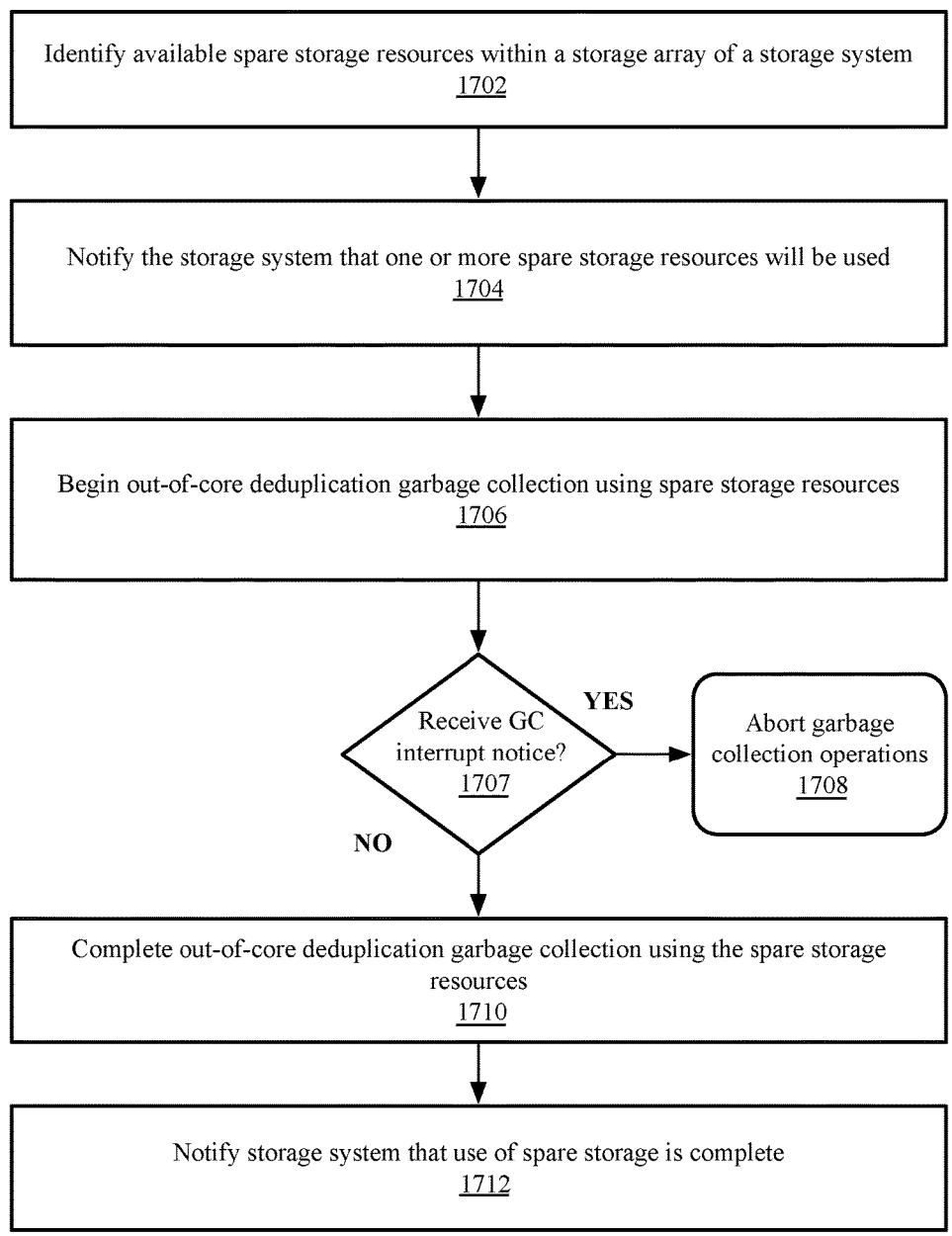
FIG. 17 is a flow diagram illustrating the operations to perform out-of-core garbage collection in a constrained storage environment using spare storage, according to an embodiment.

FIG. 17 is a flow diagram illustrating the operations 1700 to perform out-of-core garbage collection using spare storage, according to an embodiment. In one embodiment a garbage collection module 1303 as in FIG. 13 can configure physical or virtual processing resources to perform the illustrated operations 1700.

In one embodiment the operations include to identify spare storage resources within a storage array of a storage system, as shown at block 1702. The storage array can also include storage devices that store deduplicated storage containers, or the deduplicated storage containers can be stored on a different set of storage devices.

As shown a block 1704, deduplication garbage collection logic can notify the storage system via a provided application programming interface (API) that one or more spare storage resources will be used to perform deduplication garbage collection operations. In one embodiment the notification to the storage system can enable the storage system to send a return notification to the deduplication garbage collection logic in the event the spare resources become necessary to replace a failed drive in the storage array. In one embodiment the notification to the storage system can be used to enable the garbage collection logic to access to the spare resources, which may otherwise be unavailable for use.

However, in some embodiments the notification is omitted and an API is provided to enable the deduplication garbage collection logic to access the storage array without notifying the storage system or using the storage system as an intermediary. In such embodiments the storage system may become indirectly aware of the use of the spare storage resources via the access API used by the deduplication garbage collection logic.

As shown at block 1706, deduplication garbage collection logic can begin out-of-core deduplication garbage collection using the spare storage resources once access to the spare resources is acquired. The logic can store the temporary files generated by the deduplication garbage collection logic on the spare resources, distributing the spare files across the set of spare storage resources or a subset of the spare storage resources. In one embodiment the percentage of total spare resources used by the deduplication garbage collection logic can be balanced between reducing the overall processing time of the deduplication garbage collection operation and maintaining at least a portion of the spare resources available for immediate fault recovery.

The deduplication garbage collection logic can provide an interface mechanism by which the garbage collection operation can be interrupted by the storage system. If such interrupt is received at block 1707, the logic can abort the garbage collection operations at block 1708. If no interrupt is received the logic can complete out-of-core deduplication garbage collection using the spare storage resources at block 1710. In some embodiments, for example, in embodiments in which the logic is configured to notify the storage system when using spare resources for deduplication garbage collection operations, the logic can notify the storage system that the use of the spare storage resources is complete at block 1712.

In some embodiments the storage system may revoke write privileges to all other processes when the storage system is required to reclaim spare drives for fault recovery. In such embodiments there may be no notification system and garbage collection will exit or reconfigure garbage collection drive usage when the garbage collection logic receives drive unavailable or inaccessible errors in response to an attempt to access the spare drives. The reconfiguration may require the garbage collection logic to repeat at least some of the previously performed operations.

Deduplication garbage collection approaches known in the art are performed by garbage collection logic that is integrated into the main deduplication file service process. Using a modular deduplication garbage collection system, such as the deduplication storage engine with garbage collection service 1300 as in FIG. 13, various implementations of deduplication garbage collection can be performed on hardware that is external to the deduplication storage system, as via a cloud based storage or computing service, and can leverage the use of computational methods such as cloud based map/reduce processing. Additionally, where cloud based data replication is used, for example, for offsite backup replication, cloud computational resources that are local to the replicated data can be used to generate garbage collection recipes. Those recipes can then be used to perform deduplication garbage collection on locally stored data.

Figure 18:
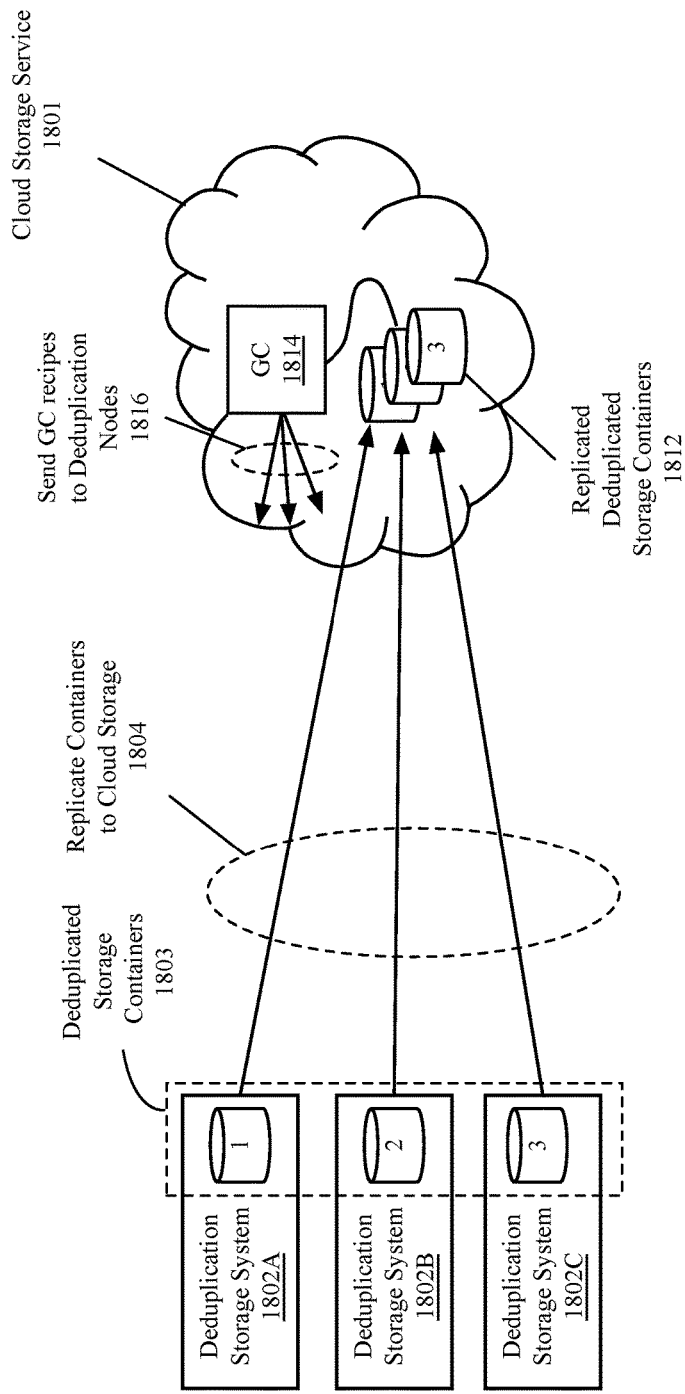
FIG. 18 is a diagram illustrating cloud based deduplication garbage collection based on replicated data, according to an embodiment.

FIG. 18 is a diagram illustrating a cloud based deduplication garbage collection system 1800 based on replicated data, according to an embodiment. In one embodiment the system includes multiple nodes of a deduplication storage system 1802A-1802C storing deduplicated data within a set of deduplicated storage containers 1803. The multiple nodes of the deduplication storage system 1802A-1802C can replicate 1804 the containers to cloud storage to be stored in a set of replicated deduplicated storage containers 1812.

In one embodiment the cloud storage service 1801 includes a garbage collection (GC) module 1814 that is configured to generate garbage collection recipes for the replicated deduplicated storage containers 1812. The garbage collection recipes can be generated using any deduplication garbage collection technique, including techniques known in the art, as well as the distributed Bloom filter deduplication garbage collection techniques of FIG. 4 through FIG. 8 and the distributed out-of-core deduplication garbage collection techniques of FIG. 9 through FIG. 12. The GC module 1814 can include logic of the garbage collection module 1303 of FIG. 13. The GC module 1814 can generate GC recipes and send 1816 the GC recipes to the nodes of the deduplication storage system 1802A-C. The nodes can then use the GC recipes to perform garbage collection operations on the deduplicated storage containers 1803, including performing the copy-forward operations to copy the live instance storage segments to new storage containers.

Figure 19:
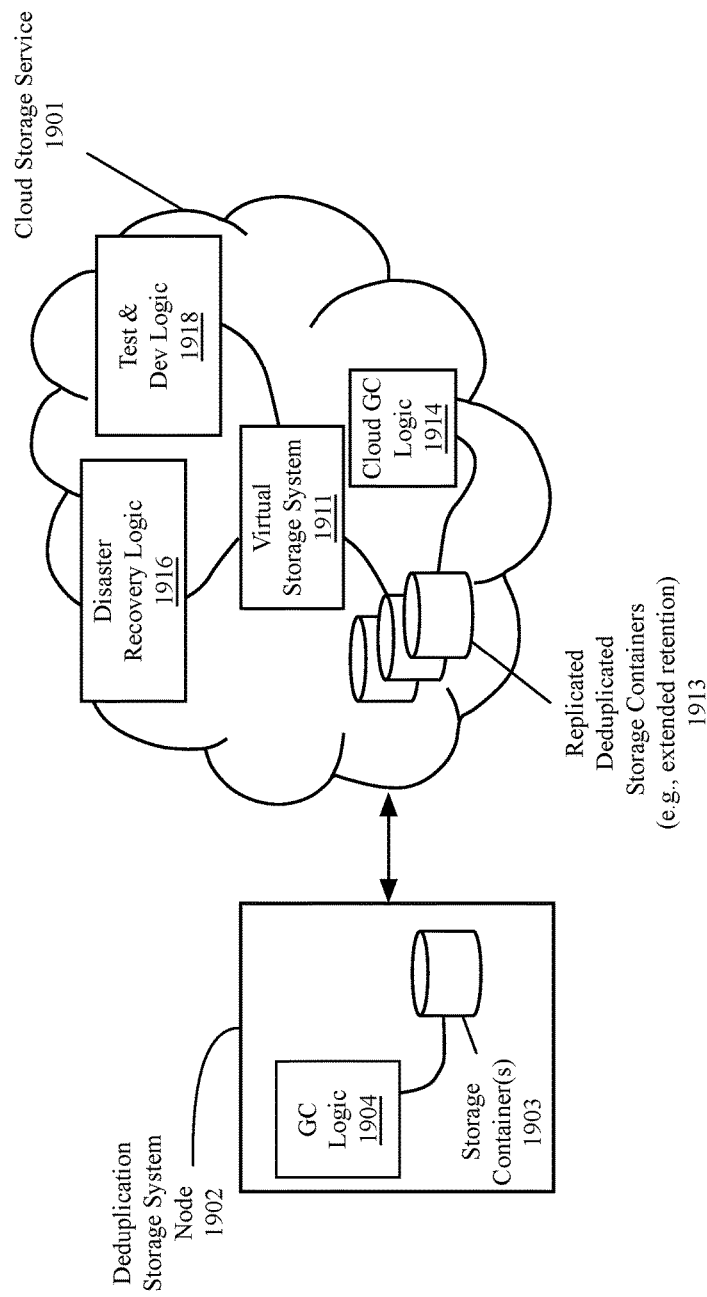
FIG. 19 is a diagram illustrating local and cloud based deduplication garbage collection based on local and replicated data, according to an embodiment.

FIG. 19 is a diagram illustrating a system 1900 of local and cloud based deduplication garbage collection based on local and replicated data, according to an embodiment. In one embodiment provides a deduplication storage system node 1902 including garbage collection (GC) logic 1904 to perform deduplication garbage collection operations on one or more storage container(s) 1903. The GC logic 1904 can include logic similar to the logic of the garbage collection module 1303 of FIG. 13, and can generate garbage collection recipe and perform copy-forward operations on the storage container(s) 1903 based on the garbage collection recipes.

In one embodiment at least a portion of the storage segments within the one or more storage container(s) 1903 can be replicated to replicated deduplicated storage containers 1913 of a cloud storage service 1901. For example, the replicated deduplicated storage containers 1913 can be extended retention storage for backup data. The extended retention storage can be used to provide long-term storage for backup data, while short-term backup data is stored in the storage container(s) 1903 of the deduplication storage system node 1902. In one embodiment, both short-term and long-term backup data may be stored in the one or more storage container(s) 1903.

In one embodiment the cloud storage service 1901 includes a virtual storage system 1911 that includes at least a subset of the logic within the deduplication storage system node 1902. The virtual storage system 1911 can interact with disaster recovery logic 1916 and test & development logic 1918. The cloud storage service 1901 can also include cloud GC logic 1914 that can generate garbage collection recipes for the replicated deduplicated storage containers 1913. The garbage collection recipes can be used in copy forward operations by the cloud GC logic 1914, in one embodiment, in conjunction with the virtual storage system 1911.

In the event that data stored on the replicated deduplicated storage containers 1913 is required, disaster recovery logic 1916 provided by the cloud storage service 1901 can be activated to enable the virtual storage system to restore some or all of the replicated data to the deduplication storage system node 1902.

Figure 20:
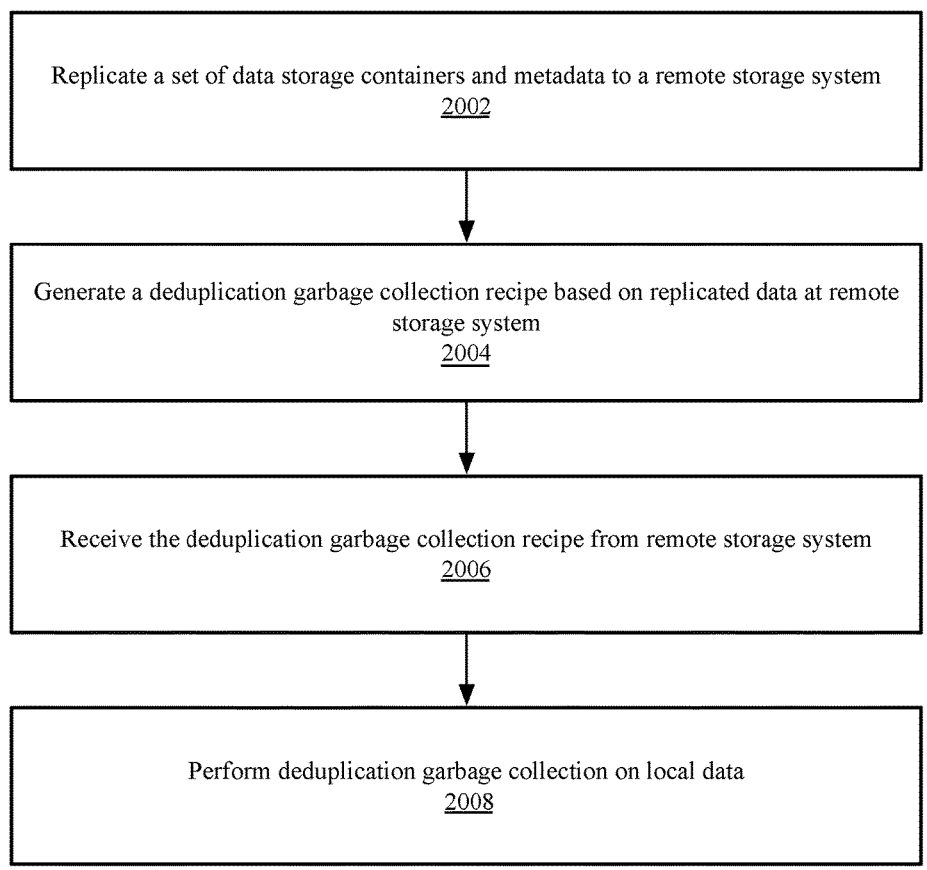
FIG. 20 is a flow diagram illustrating the operations to perform distributed recipe generation with local garbage collection, according to an embodiment.

FIG. 20 is a flow diagram illustrating operations 2000 to perform distributed recipe generation with local garbage collection, according to an embodiment. In one embodiment a portion of the operations can be performed by garbage collection (GC) module 1814 as in FIG. 18. A portion of the operations can also be performed by one or more nodes of a deduplication storage system 1802A-1802C as in FIG. 18.

In one embodiment, a node of a deduplication storage system can configure processing logic to replicate a set of data storage containers and metadata to a remote storage system, as shown at block 2002. After receiving the replicated data, a garbage collection module can generate a deduplication garbage collection recipe based on replicated data at the remote storage system, as shown at block 2004. The deduplication garbage collection recipe can be generate using any of the deduplication garbage collection techniques described herein, including distributed Bloom filter and distributed out-of-core deduplication garbage collection or deduplication garbage collection techniques known in the art.

In one embodiment a deduplication storage system node can receive the deduplication garbage collection recipe from remote storage system, as shown at block 2006, and perform deduplication garbage collection on locally stored data, as shown at block 2008.

Figure 21:
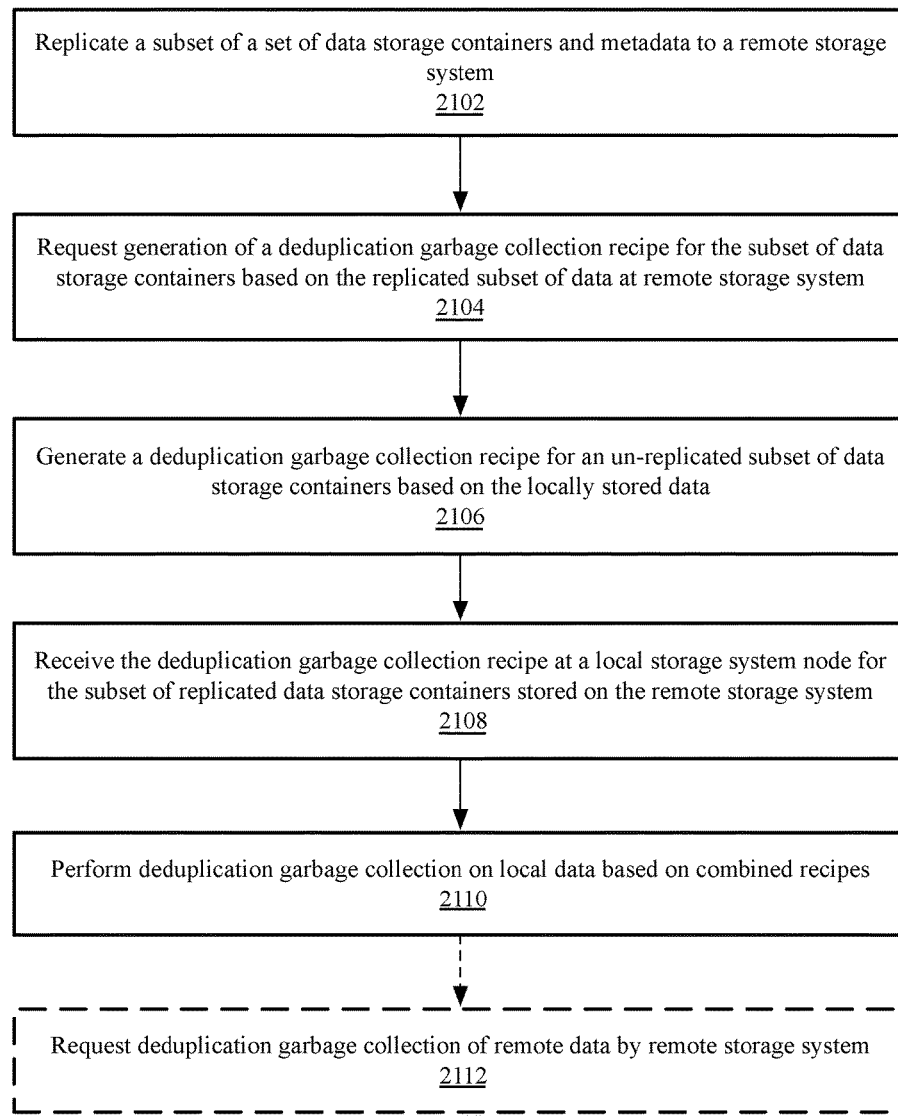
FIG. 21 is a flow diagram illustrating the operations to perform distributed and local recipe generation and local garbage collection, according to an embodiment.

FIG. 21 is a flow diagram illustrating operations 2100 to perform distributed and local recipe generation and local garbage collection, according to an embodiment. In one embodiment a portion of the operations can be performed by a deduplication storage system node 1902 with included garbage collection (GC) logic 1904 as in FIG. 19. A portion of the operations can also be performed by the cloud GC logic 1914 of a cloud storage service 1901 as in FIG. 19.

As shown at block 2102, the operations include to replicate a subset of a set of data storage containers and metadata to a remote storage system. The operations can additionally include to request generation of a deduplication garbage collection recipe for the subset of data storage containers based on the replicated sub-set of data at remote storage system, as shown at block 2104. Additionally, the operations include to generate a deduplication garbage collection recipe for an un-replicated subset of data storage containers based on the locally stored data, as shown at block 2106. At block 2108, logic executing on a local deduplication storage system can receive the deduplication garbage collection recipe at a local storage system node for the subset of replicated data storage containers stored on the remote storage system.

In one embodiment, a local deduplication storage system can perform deduplication garbage collection on local data based on a combination of the locally generated and remotely generated garbage collection recipes, as shown at block 2110. In one embodiment the operations additionally include an optional operation to request deduplication garbage collection of remote data by remote storage system, as shown at block 2112.

Figure 22:
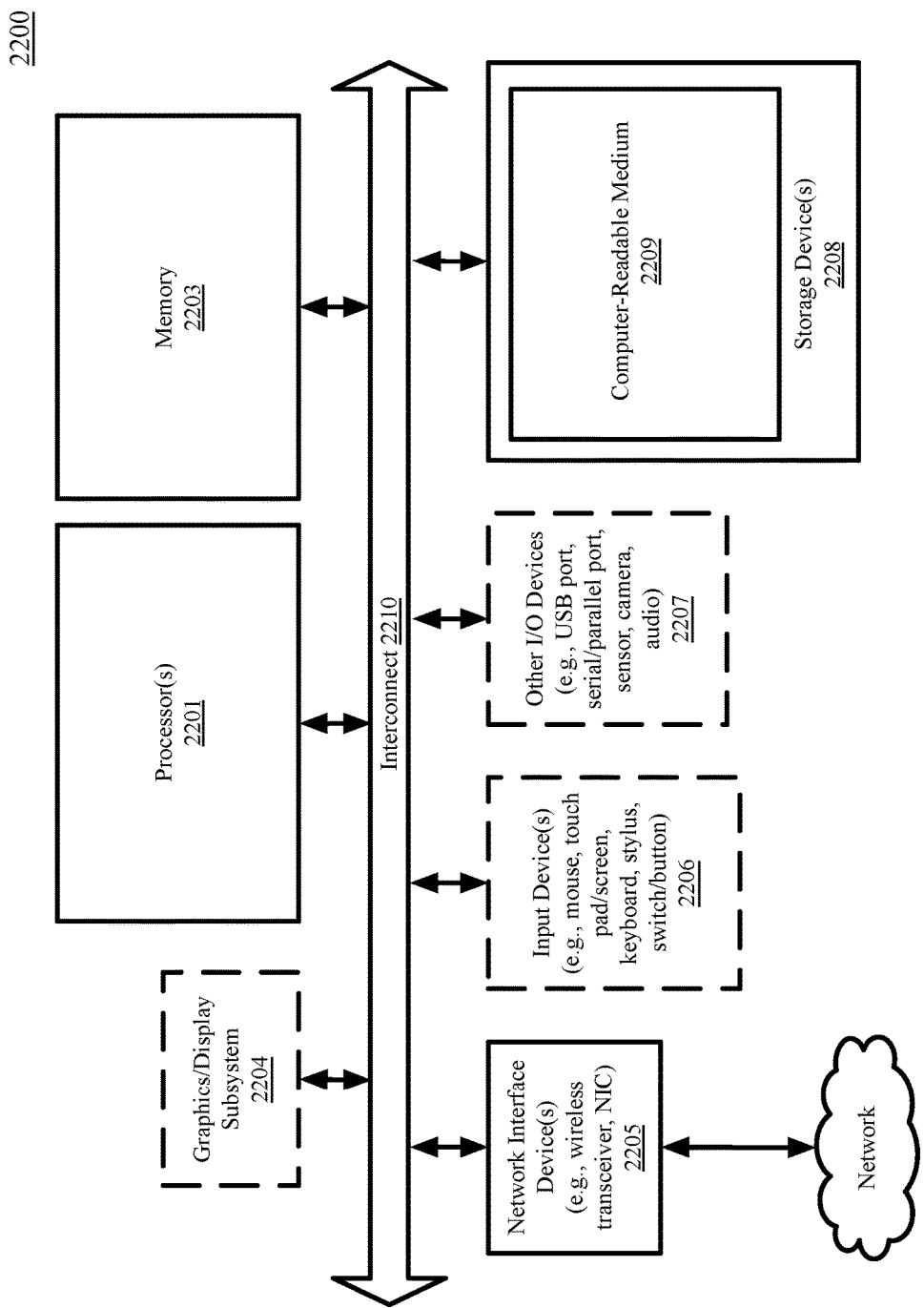
FIG. 22 is a block diagram illustrating an exemplary a data processing system that may be used with one embodiment.

FIG. 22 is a block diagram illustrating an example of a data processing system 2200 that may be used with embodiments described herein. The data processing system 2200 may represent any of the data processing systems described above and may perform any of the processes or methods described above. The data processing system 2200 can include many different components. These components can be implemented as integrated circuits (ICs), discrete electronic devices, or other modules adapted to a circuit board such as a motherboard or add-in card of the computer system, or as components otherwise incorporated within a chassis of the computer system. Note also that the data processing system 2200 is intended to show a high-level view of many components of the computer system. However, it is to be understood that additional components may be present in certain implementations and furthermore, different arrangement of the components shown may occur in other implementations. The data processing system 2200 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment the data processing system 2200 includes one or more processor(s) 2201, memory 2203, network interface devices, 2205, I/O devices, 2206, 2207 and storage device(s) 2208 connected via a bus or an interconnect 2210. The one or more processor(s) 2201 may be a single processor or multiple processors with a single processor core or multiple processor cores included therein. The processor(s) 2201 may represent one or more general-purpose processors such as a microprocessor, a central processing unit (CPU), or the like. More particularly, the processor(s) 2201 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processor(s) 2201 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

The processor(s) 2201 may be a low power multi-core processor, such as an ultra-low voltage processor, and may act as a main processing unit and central hub for communication with the various components of the system. Such processor can be implemented as a system on chip (SoC). The processor(s) 2201 are configured to execute instructions for performing the operations and steps discussed herein. The data processing system 2200 may further include a graphics/display subsystem 2204, which may include a display controller, a graphics processor, and/or a display device. In one embodiment at least a portion of the graphics/display subsystem 2204 is integrated into the processors(s) 2201. The graphics/display subsystem 2204 is optional and some embodiments may not include one or more components of the graphics/display subsystem 2204.

The processor(s) 2201 communicates with memory 2203, which in one embodiment can be implemented via multiple memory devices to provide for a given amount of system memory. The memory 2203 may include one or more volatile storage (or memory) devices such as random access memory (RAM), dynamic RAM (DRAM), synchronous DRAM (SDRAM), static RAM (SRAM), or other types of storage devices. The memory 2203 may store information including sequences of instructions that are executed by the one or more processor(s) 2201 or any other device. For example, executable code and/or data of a variety of operating systems, device drivers, firmware (e.g., input output basic system or BIOS), and/or applications can be loaded in the memory 2203 and executed by one of the processor(s) 2201. The operating system can be any kind of operating system such as, for example, Windows® operating system from Microsoft®, Mac OS®/iOS® from Apple, Android® from Google®, Linux®, Unix®, or other real-time or embedded operating systems such as VxWorks.

The data processing system 2200 may further include I/O devices such as a network interface device(s) 2205, input device(s) 2206, and other I/O device(s) 2207. Some of the input device(s) 2206 and other I/O device(s) 2207 may be optional and are excluded in some embodiments. The network interface device(s) 2205 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

The input device(s) 2206 may include a mouse, a touch pad, a touch sensitive screen (which may be integrated with a display device of the graphics/display subsystem 2204), a pointer device such as a stylus, and/or a keyboard (e.g., physical keyboard or a virtual keyboard displayed as part of a touch sensitive screen). For example, the input device(s) 2206 may include a touch screen controller coupled to a touch screen. The touch screen and touch screen controller can, for example, detect contact and movement or a break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

The other I/O device(s) 2207 may also include an audio device. An audio device may include a speaker and/or a microphone to facilitate voice-enabled functions, such as voice recognition, voice replication, digital recording, and/or telephony functions. The other I/O device(s) 2207 may also include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. The other I/O device(s) 2207 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 2210 via a sensor hub (not shown), while other devices such as a keyboard or thermal sensor may be controlled by an embedded controller (not shown), dependent upon the specific configuration or design of data processing system 2200.

To provide for persistent storage of information such as data, applications, one or more operating systems and so forth, a mass storage (not shown) may also couple to the processor(s) 2201. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of flash based storage to act as an SSD cache to enable non-volatile storage of context state and other such information during power down events so that a fast power up can occur on re-initiation of system activities. In addition, a flash device may be coupled to the processor(s) 2201, e.g., via a serial peripheral interface (SPI). This flash device may provide for non-volatile storage of system software, including a basic input/output software (BIOS) as well as other firmware of the system.

The storage device(s) 2208 may include computer-readable storage medium 2209 (also known as a machine-readable storage medium) on which is stored one or more sets of instructions or software embodying any one or more of the methodologies or functions described herein. The computer-readable storage medium 2209 may also be used to store the some software functionalities described above persistently. While the computer-readable storage medium 2209 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Note that while the data processing system 2200 is illustrated with various components of a data processing system, it is not intended to represent any particular architecture or manner of interconnecting the components; as such, details are not germane to embodiments of the present invention. It will also be appreciated that network computers, handheld computers, mobile phones, servers, and/or other data processing systems, which have fewer components or perhaps more components, may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially. Embodiments described herein are not described with reference to any particular programming language. It will be appreciated that a variety of programming languages may be used to implement the teachings of embodiments of the invention as described herein.

The following clauses and/or examples pertain to specific embodiments or examples thereof. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system according to embodiments and examples described herein. Various components can be a means for performing the operations or functions described.

Embodiments described herein generally provide systems and methods to perform distributed deduplication garbage collection on storage containers used for data deduplication.

One embodiment provides for a computer implemented method for distributed garbage collection of deduplicated datasets where the method comprises creating a first set of Bloom filters distributed across a set of multiple computing device nodes, each Bloom filter associated with a range of fingerprints for data stored on one or more deduplicated storage containers; creating a second set of Bloom filters distributed across the set of multiple computing device nodes, the second set of Bloom filters including a set of fingerprints correlated with files in a file system directory structure; determining a set of live fingerprints for each of the one or more deduplicated storage containers, wherein for each of the one or more deduplicated storage containers, the set of live fingerprints includes a fingerprint of data stored on the storage container that is associated with a file in the file system directory structure; and copying a storage segment having a fingerprint in the list of live fingerprints from the one or more deduplicated storage containers to one or more new storage containers.

One embodiment provides for a system to perform distributed garbage collection of deduplicated datasets, the system comprising one or more storage units to store a set of deduplicated storage containers; a processor coupled to the one or more storage units; and a memory coupled to the processor for storing instructions, which when executed from the memory, cause the processor to create a first Bloom filter in a first set of Bloom filters, the first Bloom filter associated with a range of fingerprints for storage segments stored in the set of deduplicated storage containers; create a second Bloom filter in a second set of Bloom filters including a set of fingerprints correlated with files stored in a file system directory structure; determine a set of live fingerprints for one or more deduplicated storage containers in the set of deduplicated storage containers the set of live fingerprints including a fingerprint associated with a storage segment within the one or more storage containers, the fingerprint associated with a live file in the file system directory structure; and copy the storage segment from the one or more deduplicated storage containers to one or more new storage containers.

One embodiment provides for a networked system comprising a set of multiple computing devices, each computing device to provide one or more deduplication and replication services to one or more deduplicated storage containers and a central computing device connected to each computing device in the set of multiple computing devices over a local network, the central computing device to provide deduplication garbage collection to each computing device in the set of computing devices. In a further embodiment, the central computing device configured to perform garbage collection operations on one or more deduplicated storage containers, each of the one or more deduplicated storage containers associated with a separate computing device in the set of computing devices. In one embodiment the set of multiple computing devices provide an application programming interface (API) to enable the set of multiple computing devices to coordinate deduplication garbage collection operations with the central computing device for on the one or more deduplicated storage containers. The central computing device can perform garbage collection operations in an order based on a fullness factor or an amount or space to be reclaimed from one or more deduplicated storage containers associated with the set of multiple computing devices.

One embodiment provides for a method for distributed garbage collection of deduplicated datasets, the method comprising creating a first set of temporary files, each temporary file in the first set of temporary files stored on a node in a set of multiple computing device nodes and associated with a range of fingerprints for data within data files associated with a directory tree structure; creating a second set of temporary files, each temporary file in the second set of temporary files stored on a node in the set of multiple computing device nodes, each temporary file associated with a range of fingerprints of storage segments stored on one or more deduplicated storage containers; sorting the fingerprints in each temporary file using distributed out of core sorting across each node in the set of multiple computing device nodes to generate a first set of sorted files and a second set of sorted files; determining an intersection of the fingerprints in the first set of sorted files and the second set of sorted files; and generating a garbage collection recipe for each of the one or more deduplicated storage containers.

One embodiment provides for a non-transitory machine-readable medium storing instructions which, when executed by one or more processors of a data processing system, cause the data processing system to perform operations including enumerating a subset of fingerprints for storage segments in a deduplicated storage container and store fingerprints into separate temporary files in a first set of temporary files, each temporary file associated with a different range of fingerprint identifiers; enumerating a subset of fingerprints for storage segments referenced by files in a directory structure and store fingerprints into separate temporary files in a second set of temporary files, each temporary file associated with a different range of fingerprint identifiers; transmitting temporary files to a compute node associated with the range of the files; receiving temporary files from the compute node, the received files associated with a same range of fingerprint identifiers; sorting the fingerprints in the temporary files to generate a first set of sorted files including fingerprints from the first set of temporary files and a second set of sorted files including fingerprints from the second set of temporary files; and generating at least a portion of a deduplication garbage collection recipe for the deduplicated storage container based on an intersection of fingerprints in the first set of sorted files and the second set of sorted files.

One embodiment provides for a system to perform distributed garbage collection of deduplicated datasets, the system comprising one or more storage units to store a deduplicated storage container; a processor coupled to the one or more storage units; and a memory coupled to the processor for storing instructions, which when executed from the memory, cause the processor to create a first file in a first set of temporary files, the first file associated with a first range of fingerprints for data within data files associated with a directory tree structure; create a second file in a second set of temporary files, the second file associated with a second range of fingerprints of storage segments stored on the deduplicated storage container; transmit the first file to a compute node associated with the first range of fingerprints; receive a third file including fingerprints in the second range of fingerprints for data within data files associated with a directory tree structure; sort the fingerprints in the first file and the third file; determine an intersection of the fingerprints in the first file and the third file; and generate a portion of a deduplication garbage collection recipe including fingerprints in the second range of fingerprints for the deduplicated storage container based on an intersection of fingerprints in the first file and the third file and a fingerprint index that stores an association of fingerprints and container identifiers.

One embodiment provides for a data storage system comprising an array of redundant storage devices including a first set of storage devices to be configured as live storage devices and a second set of storage devices to be configured as spare storage devices, a spare storage device to be enabled in event of a failure of a live storage device and a set of processing devices coupled to the array of redundant storage devices, the set of processing devices to execute logic to enable data replication and deduplication for the array of redundant storage devices and perform distributed deduplication garbage collection on the first set of storage devices using one or more devices in the second set of storage devices as temporary storage. In one embodiment the set of processing devices are virtual processing devices managed by a virtual machine manager.

One embodiment provides for a computer implemented method comprising configuring an array of redundant storage devices including a first set of storage devices and a second set of storage devices, the second set of storage devices configured as spare storage devices and performing distributed deduplication garbage collection on deduplicated storage containers on the first set of storage devices using one or more devices in the second set of storage devices as temporary storage.

One embodiment provides for a deduplication data storage system comprising a set of storage devices including a set of storage containers; one or more computing device nodes coupled to the set of storage devices, the one or more computing device nodes to enable replication and deduplication of the set of storage containers on the set of storage devices; and a set of remote storage servers coupled to the one or more computing device nodes over a network, the set of remote storage servers to receive a replication of data on the set of storage containers from the one or more computing device nodes, and to generate a deduplication garbage collection recipe for the set of storage containers. The remote storage servers can transfer the deduplication garbage collection recipe to the one or more computing device nodes. In one embodiment local storage devices and remote storage devices share a common set of storage containers which are to be cleaned cooperatively. In one embodiment local storage devices and the remote storage devices have a unique, non-shared, set of containers which they clean independently.

One embodiment provides for a non-transitory machine-readable medium storing instructions which, when executed by one or more processors of a data processing system, cause the data processing system to perform operations including replicating a set of data storage containers and metadata to a remote storage system; generating a deduplication garbage collection recipe based on replicated data at the remote storage system; receiving the deduplication garbage collection recipe from the remote storage system; and performing deduplication garbage collection locally on the set of data storage containers based on the deduplication garbage collection recipe received from the remote storage system.

One embodiment provides for a non-transitory machine readable medium storing instructions which, when executed by one or more processors of a data processing system, cause the data processing system to perform operations including replicating a subset of a set of data storage containers and metadata to a remote storage system; requesting generation of a deduplication garbage collection recipe for the subset of data storage containers based on the replicated subset of data at the remote storage system; generating a deduplication garbage collection recipe for an un-replicated subset of data storage containers based on a locally stored instance of the un-replicated subset; receiving the deduplication garbage collection recipe at a local storage system node for a subset of replicated data storage containers stored on the remote storage system; and performing deduplication garbage collection on local data based on a locally generated recipe and a remotely generated recipe.

In the foregoing specification, the invention has been described with reference to specific embodiments thereof. However, various modifications and changes can be made thereto without departing from the broader spirit and scope of the invention. The specification and drawings are, accordingly, to be regarded in an illustrative rather than a restrictive sense.

What is claimed is:

1. A data storage system comprising:
an array of redundant storage devices including a first set of storage devices to be configured as live storage devices and a second set of storage devices to be configured as spare storage devices, a spare storage device to be enabled in event of a failure of a live storage device; and
a set of processing devices coupled to the array of redundant storage devices, the set of processing devices to execute logic to enable data replication and deduplication for the array of redundant storage devices and perform distributed deduplication garbage collection on the first set of storage devices using one or more devices in the second set of storage devices as temporary storage, wherein the set of processing devices, to perform distributed deduplication garbage collection, is configured to:
create a first set of temporary files, each temporary file in the first set of temporary files stored on one or more of the second set of storage devices and associated with a range of fingerprints for data within data files stored in a directory tree structure in the first set of storage devices; and
create a second set of temporary files, each temporary file in the second set of temporary files stored on one or more of the second set of storage devices and associated with a range of fingerprints of storage segments stored on one or more deduplicated storage containers on the first set of storage devices.

2. The data storage system as in claim 1, wherein the set of processing devices are virtual processing devices managed by a virtual machine manager.

3. The data storage system as in claim 1, wherein the set of processing devices are configured to create the first set of temporary files and in parallel with creation of the second set of temporary files.

4. The data storage system as in claim 1, wherein the set of processing devices are further configured to:
sort the fingerprints in each temporary file via a distributed out-of-core sort across each processing device in the set of processing devices;
determine an intersection of the fingerprints in the first set of temporary files and the second set of temporary files; and
generate a garbage collection recipe for each of the one or more deduplicated storage containers.

5. The data storage system as in claim 4, wherein determining an intersection of the fingerprints in the first set of temporary files and the second set of temporary files comprises determining a set of revived storage segments stored on the one or more deduplicated storage containers, the revived storage segments associated with one or more data files stored in the directory tree structure, the association created after creation of the first set of temporary files.

6. The data storage system as in claim 4, wherein generating the garbage collection recipe comprises sorting an intersection of fingerprints from the two sets of temporary files based on a container identifier associated with each fingerprint, each container identifier to identify one of the one or more deduplicated storage containers.

7. The data storage system as in claim 6, wherein sorting the intersection of fingerprints comprises:
creating a third set of temporary files including the intersection of fingerprints, each temporary file in the third set of temporary files to be stored on a storage device in the second set of storage devices and associated with one processing device in the set of processing devices; and
sorting the intersection of fingerprints via a distributed out of core sort across each processing devices, wherein each processing device is to store a fingerprint into a file on the second set of storage devices based on the container identifier associated with the fingerprint.

8. The data storage system as in claim 6, wherein to sort the intersection of fingerprints, each processing device in the set of processing devices is further configured to:
transfer a set of fingerprints associated with a container identifier to the processing device assigned to that container identifier;
receive the set of fingerprints associated with the container identifier for the processing device; and
store the set of fingerprints in a file to generate the garbage collection recipe for a container identifier.

9. The data storage system as in claim 6, wherein one or more processing devices in the set of processing devices are configured to:
read the garbage collection recipe associated with one of the one or more deduplicated storage containers;
copy the storage segments identified in the garbage collection recipe from the one or more deduplicated storage containers to a new storage container; and
delete the one or more deduplicated storage containers.

10. The data storage system as in claim 9, wherein the one or more processing devices are further configured to copy the storage segments identified in the garbage collection recipe in parallel for multiple deduplicated storage containers.

11. A computer implemented method comprising:
configuring an array of redundant storage devices including a first set of storage devices and a second set of storage devices, the second set of storage devices configured as spare storage devices; and
performing distributed deduplication garbage collection on deduplicated storage containers on the first set of storage devices using one or more devices in the second set of storage devices as temporary storage, wherein performing distributed deduplication garbage collection comprises
creating a first set of temporary files, each temporary file in the first set of temporary files stored on one or more of the second set of storage devices and associated with a range of fingerprints for data within data files stored in a directory tree structure in the first set of storage devices; and
creating a second set of temporary files, each temporary file in the second set of temporary files stored on one or more of the second set of storage devices and associated with a range of fingerprints of storage segments stored on one or more deduplicated storage containers on the first set of storage devices.

12. The computer implemented method as in claim 11, further comprising creating the first set of temporary files and in parallel with creating the second set of temporary files.

13. The computer implemented method as in claim 11, further comprising:
sorting the fingerprints in each temporary file via a distributed out-of-core sort across each processing device in a set of processing devices;
determine an intersection of the fingerprints in the first set of temporary files and the second set of temporary files; and generate a garbage collection recipe for each of the one or more deduplicated storage containers.

14. The computer implemented method as in claim 13, wherein determining an intersection of the fingerprints in the first set of temporary files and the second set of temporary files includes determining a set of revived storage segments stored on the one or more deduplicated storage containers, the revived storage segments associated with one or more data files stored in the directory tree structure, the association created after creation of the first set of temporary files.

15. The computer implemented method as in claim 14, further comprising aborting the distributed deduplication garbage collection in response to losing access to one or more devices in the second set of storage devices due to a failure of devices in the first set of storage devices.

16. A non-transitory machine-readable medium storing instructions which, when executed by one or more processors of a data processing system, cause the data processing system to perform operations including:
configuring an array of redundant storage devices including a first set of storage devices and a second set of storage devices, the second set of storage devices configured as spare storage devices;
performing distributed deduplication garbage collection on deduplicated storage containers on the first set of storage devices using one or more devices in the second set of storage devices as temporary storage, wherein performing distributed deduplication garbage collection comprises
creating a first set of temporary files, each temporary file in the first set of temporary files stored on one or more of the second set of storage devices and associated with a range of fingerprints for data within data files stored in a directory tree structure in the first set of storage devices, and
creating a second set of temporary files, each temporary file in the second set of temporary files stored on one or more of the second set of storage devices and associated with a range of fingerprints of storage segments stored on one or more deduplicated storage containers on the first set of storage devices.

17. The non-transitory machine-readable medium as in claim 16, wherein the operations further comprise creating the first set of temporary files and in parallel with creating the second set of temporary files.

18. The non-transitory machine-readable medium as in claim 16, wherein the operations further comprise:
sorting the fingerprints in each temporary file via a distributed out-of-core sort across each processing device in a set of processing devices;
determine an intersection of the fingerprints in the first set of temporary files and the second set of temporary files; and
generate a garbage collection recipe for each of the one or more deduplicated storage containers.

19. The non-transitory machine-readable medium as in claim 18, wherein determining an intersection of the fingerprints in the first set of temporary files and the second set of temporary files includes determining a set of revived storage segments stored on the one or more deduplicated storage containers, the revived storage segments associated with one or more data files stored in the directory tree structure, the association created after creation of the first set of temporary files.

20. The non-transitory machine-readable medium as in claim 19, wherein the operations further comprise aborting the distributed deduplication garbage collection in response to losing access to one or more devices in the second set of storage devices due to a failure of devices in the first set of storage devices.

* * * * *